United States Patent
Novin et al.

(10) Patent No.: US 10,538,185 B2
(45) Date of Patent: Jan. 21, 2020

(54) FRICTION MODULE, FRICTION HINGE, AND ADJUSTABLE HEADREST INCLUDING THE FRICTION MODULE AND/OR FRICTION HINGE

(71) Applicant: Southco, Inc., Concordville, PA (US)

(72) Inventors: Eugene Novin, Blue Bell, PA (US); Andrew S. Matejka, Columbus, OH (US)

(73) Assignee: SOUTHCO, INC., Concordville, PA (US)

( * ) Notice: Subject to any disclaimer, the term of this patent is extended or adjusted under 35 U.S.C. 154(b) by 0 days.

(21) Appl. No.: 16/005,397

(22) Filed: Jun. 11, 2018

(65) Prior Publication Data
US 2018/0319302 A1 Nov. 8, 2018

Related U.S. Application Data

(63) Continuation-in-part of application No. 15/558,645, filed as application No. PCT/US2016/022606 on Mar. 16, 2016, now Pat. No. 10,336,230.
(Continued)

(51) Int. Cl.
*B60N 2/824* (2018.01)
*B60N 2/826* (2018.01)
(Continued)

(52) U.S. Cl.
CPC ............ *B60N 2/824* (2018.02); *B60N 2/826* (2018.02); *B60N 2/844* (2018.02); *B60N 2/85* (2018.02);
(Continued)

(58) Field of Classification Search
CPC .......... B60N 2/809; B60N 2/826; B60N 2/85; B60N 2/812; B60N 2/824; B60N 2/885;
(Continued)

(56) References Cited

U.S. PATENT DOCUMENTS

| 4,527,834 A | 7/1985 | Zyngier |
| 4,840,428 A | 6/1989 | Kobayashi et al. |

(Continued)

FOREIGN PATENT DOCUMENTS

| FR | 2099760 A5 | 3/1972 |
| WO | 2016149341 A1 | 9/2016 |

OTHER PUBLICATIONS

Non Final Office Action for U.S. Appl. No. 15/558,645, dated Oct. 19, 2018, 15 pages.
(Continued)

*Primary Examiner* — Mark R Wendell
(74) *Attorney, Agent, or Firm* — RatnerPrestia

(57) ABSTRACT

Adjustable headrest including a guide configured to be coupled to a seat; a head support coupled to the guide and configured to be movable along an adjustment path relative to the seat; and a slider having a surface defining a recess receiving the guide. A retainer is positioned to urge a surface of the slider against a surface of the guide, thereby maintaining friction between the surface of the slider and the surface of the guide. Additionally, the adjustable headrest includes a bracket that is fixable relative to the head support or fixed relative to the seat. The bracket has a mounting section positioned for fixation relative to the head support or for fixation to the seat and a guide receiving portion receiving the guide. The slider and the bracket are separate components and are formed from the same material or different materials.

32 Claims, 35 Drawing Sheets

Related U.S. Application Data

(60) Provisional application No. 62/133,778, filed on Mar. 16, 2015.

(51) Int. Cl.
| | | |
|---|---|---|
| *B60N 2/885* | (2018.01) | |
| *F16C 11/10* | (2006.01) | |
| *B60N 2/85* | (2018.01) | |
| *B60N 2/844* | (2018.01) | |
| *F16C 29/02* | (2006.01) | |

(52) U.S. Cl.
CPC ............ *B60N 2/885* (2018.02); *F16C 11/103* (2013.01); *F16C 29/02* (2013.01); *F16C 2326/08* (2013.01); *F16C 2326/43* (2013.01); *F16M 2200/027* (2013.01)

(58) Field of Classification Search
CPC .. B64D 11/0642; F16C 11/103; F16D 63/008; F16M 13/022; F16M 2200/027
USPC .......................................................... 297/410
See application file for complete search history.

(56) References Cited

U.S. PATENT DOCUMENTS

| | | |
|---|---|---|
| 7,434,886 B2 | 10/2008 | Yamada |
| 9,004,803 B2 | 4/2015 | Wanke et al. |
| 9,592,755 B2 | 3/2017 | Takayama et al. |
| 9,902,301 B2 | 2/2018 | Aquillue et al. |
| 10,099,589 B2 | 10/2018 | Takeuchi et al. |
| 2004/0007910 A1 | 1/2004 | Skelly |
| 2012/0124777 A1 | 5/2012 | Keller |
| 2012/0200135 A1 | 8/2012 | Muto et al. |
| 2013/0069412 A1 | 3/2013 | Tscherbner et al. |

OTHER PUBLICATIONS

International Preliminary Report on Patentability for International Application No. PCT/US2016/022606, dated Sep. 19, 2017, 9 Pages.
International Search Report and Written Opinion for International Application No. PCT/US2016/022606, dated Jun. 21, 2016, 12 Pages.
Notice of Allowance for U.S. Appl. No. 15/558,645, dated Apr. 17, 2019, 12 pages.
Invitation to Pay Additional Fees and, Where Applicable, Protest Fees and Communication relating to the results of the Partial international Search for International Application No. PCT/US2019/036062, dated Oct. 7. 2019. 10 pages.

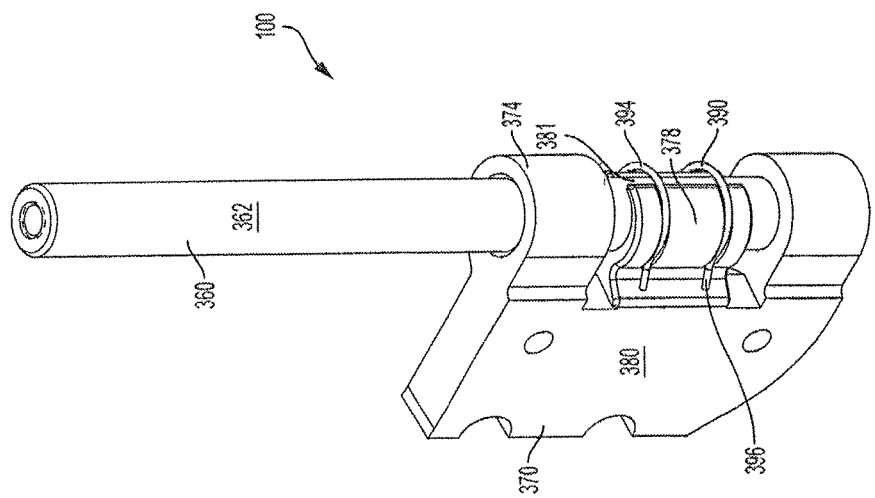
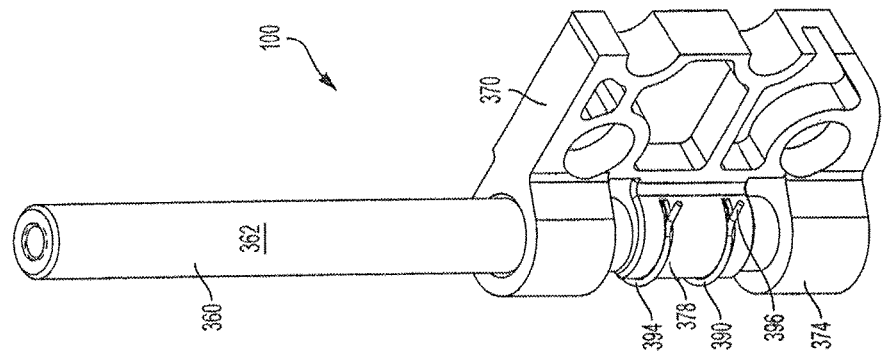

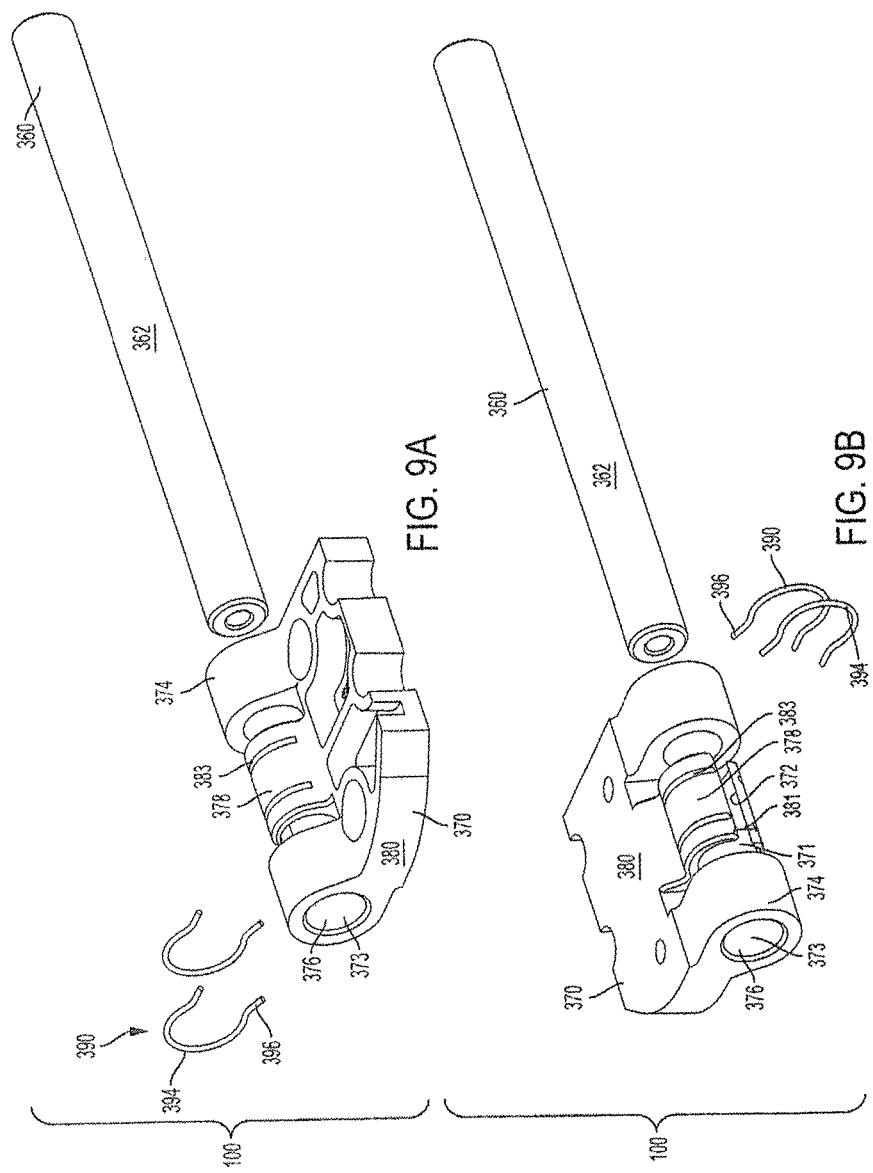

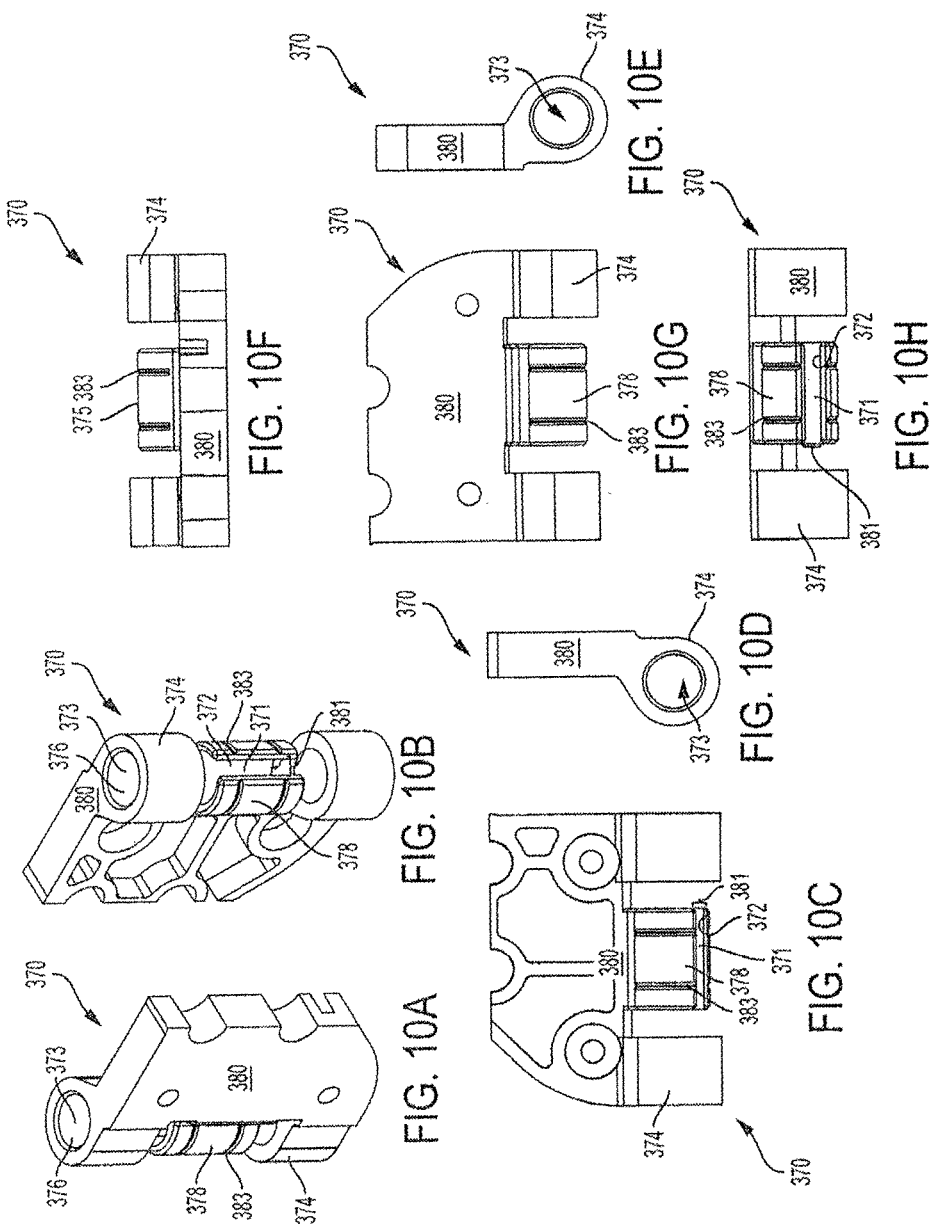

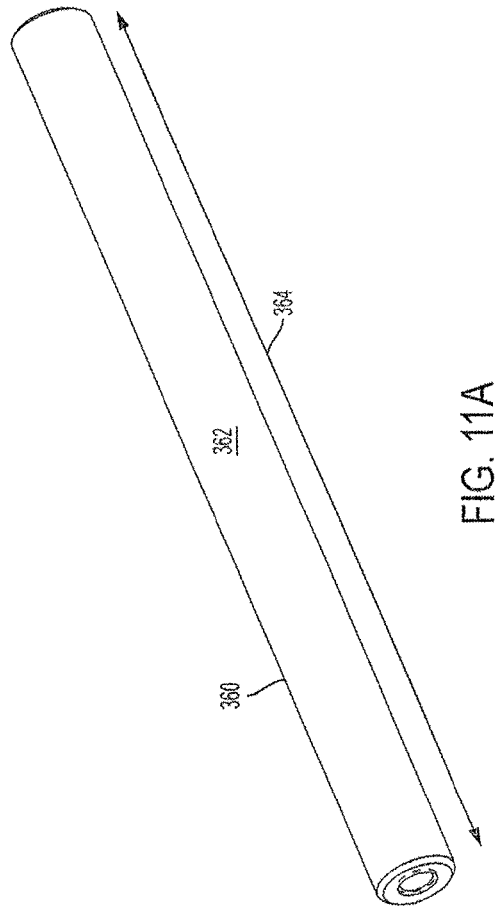
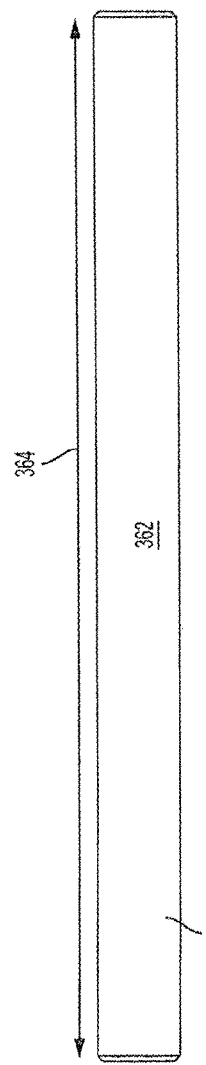
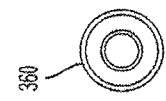
FIG. 11A
FIG. 11B
FIG. 11C

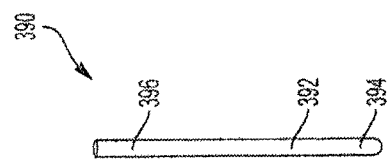
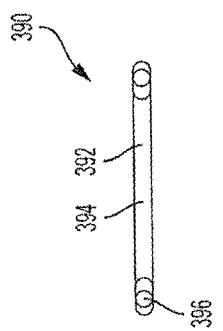
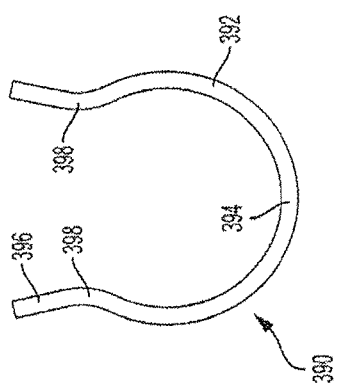
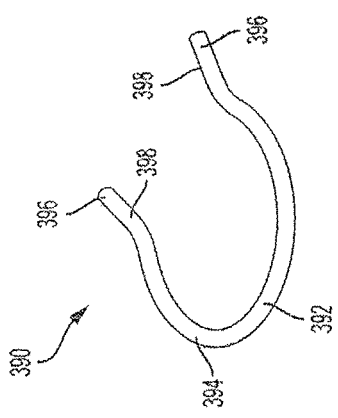
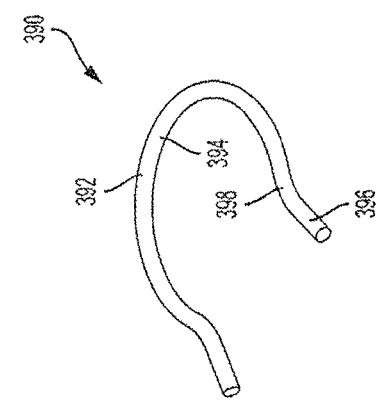

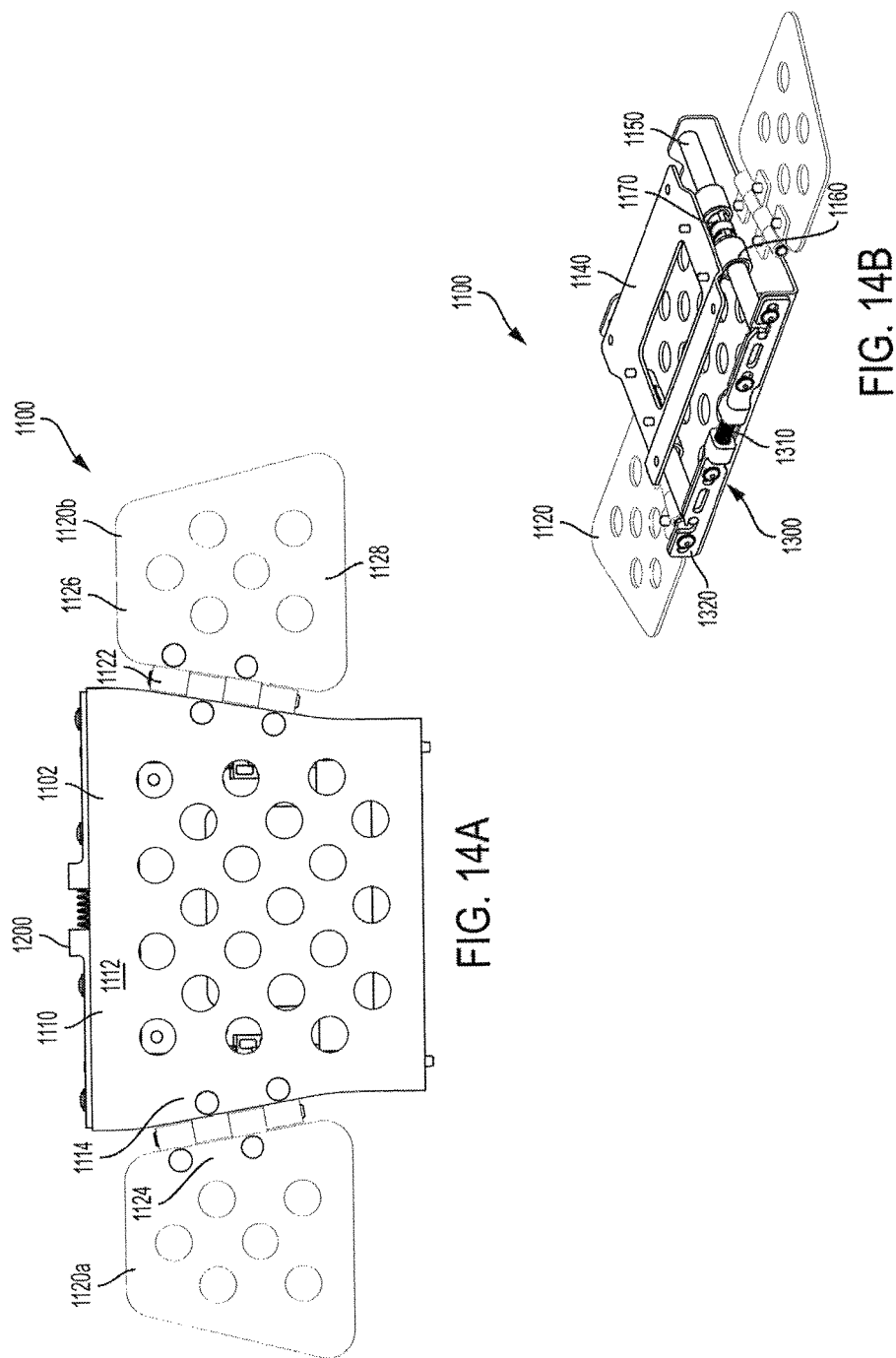

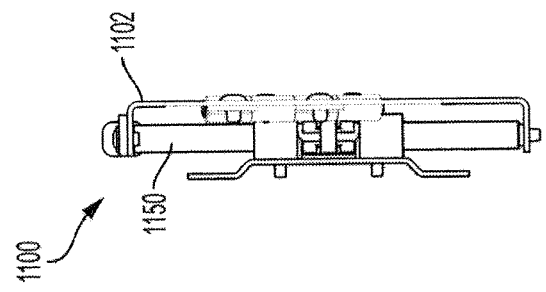
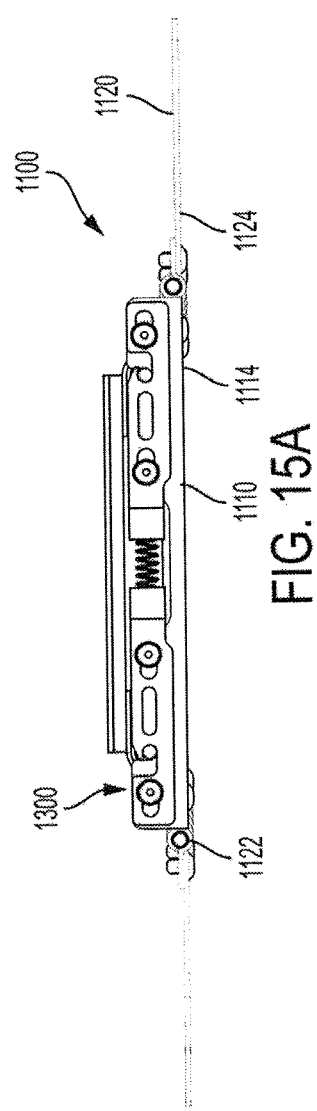
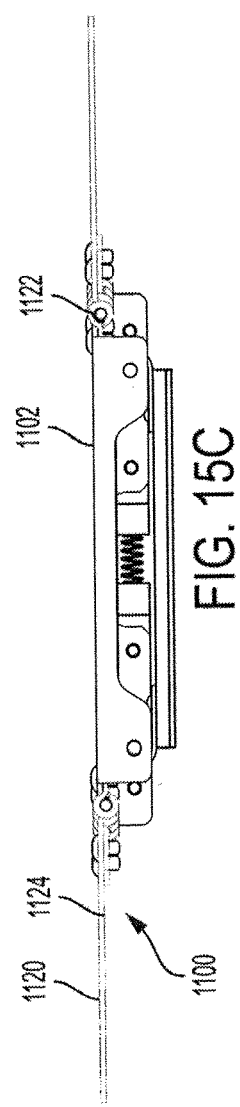

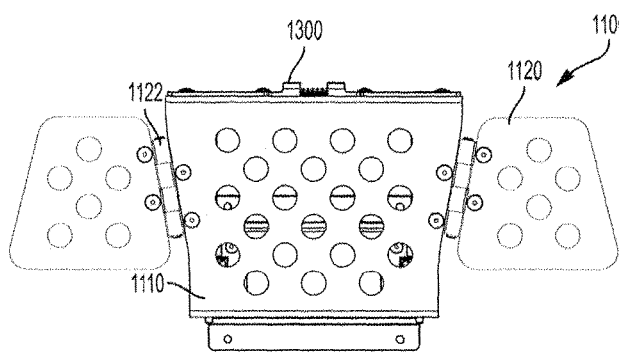 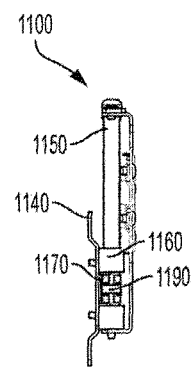
FIG. 16A    FIG. 16B
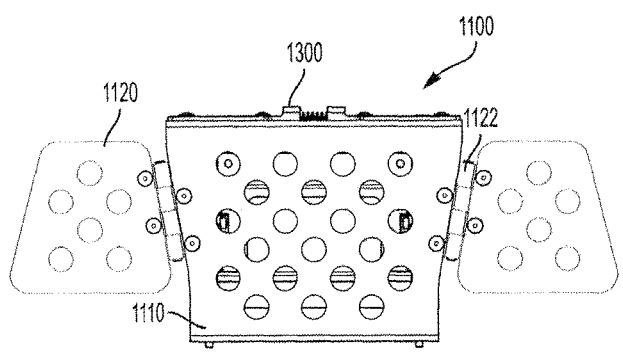 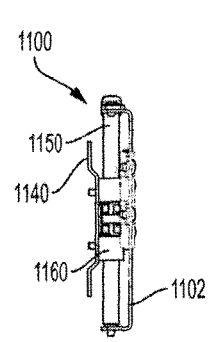
FIG. 16C    FIG. 16D
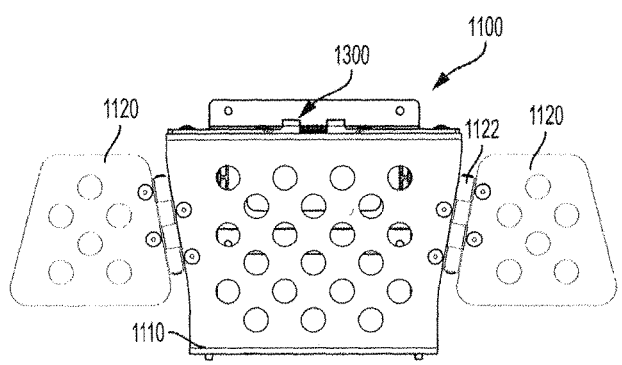 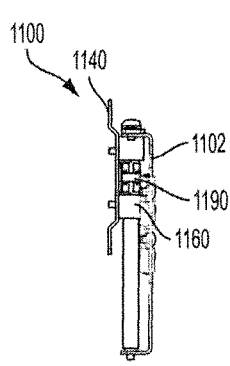
FIG. 16E    FIG. 16F

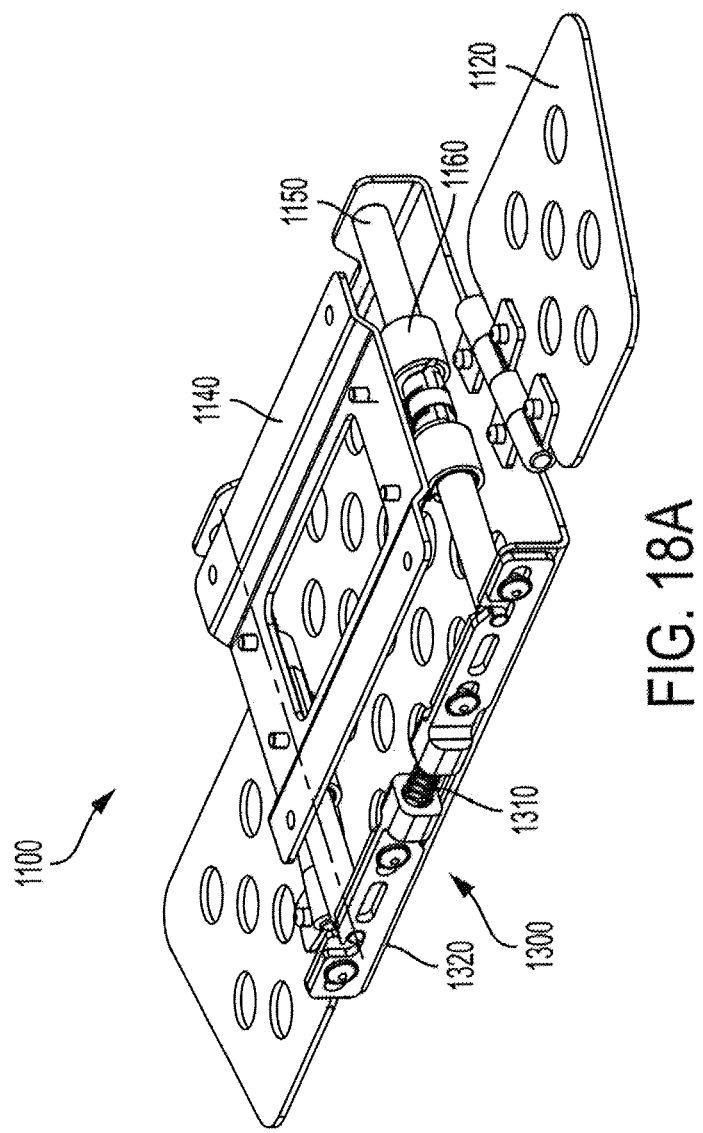

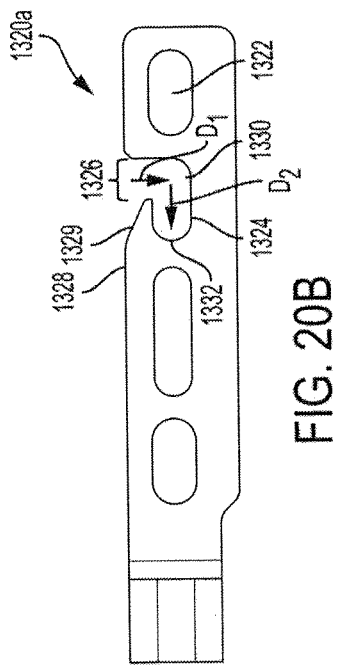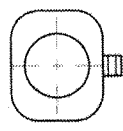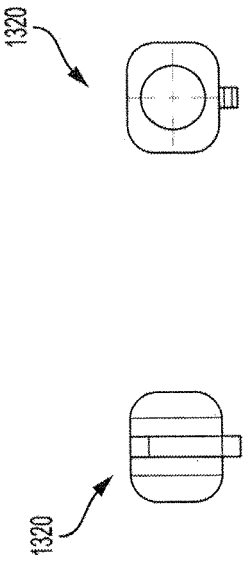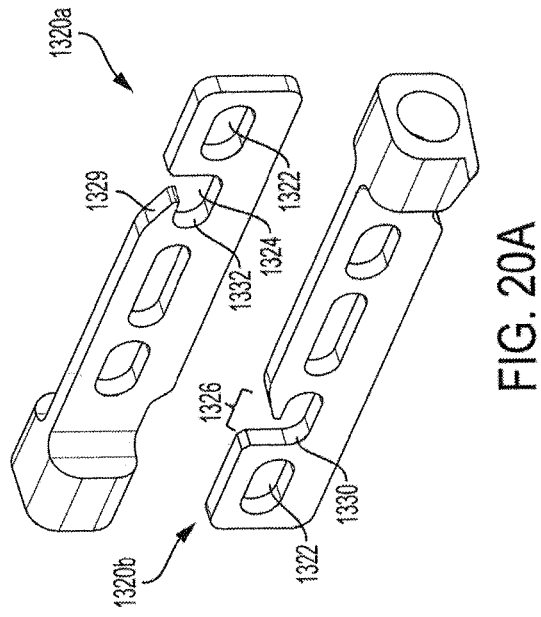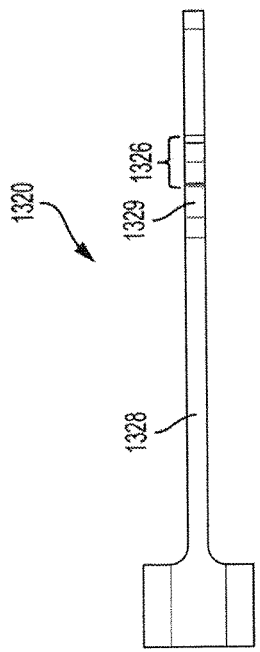
FIG. 20B
FIG. 20E
FIG. 20D
FIG. 20A
FIG. 20C

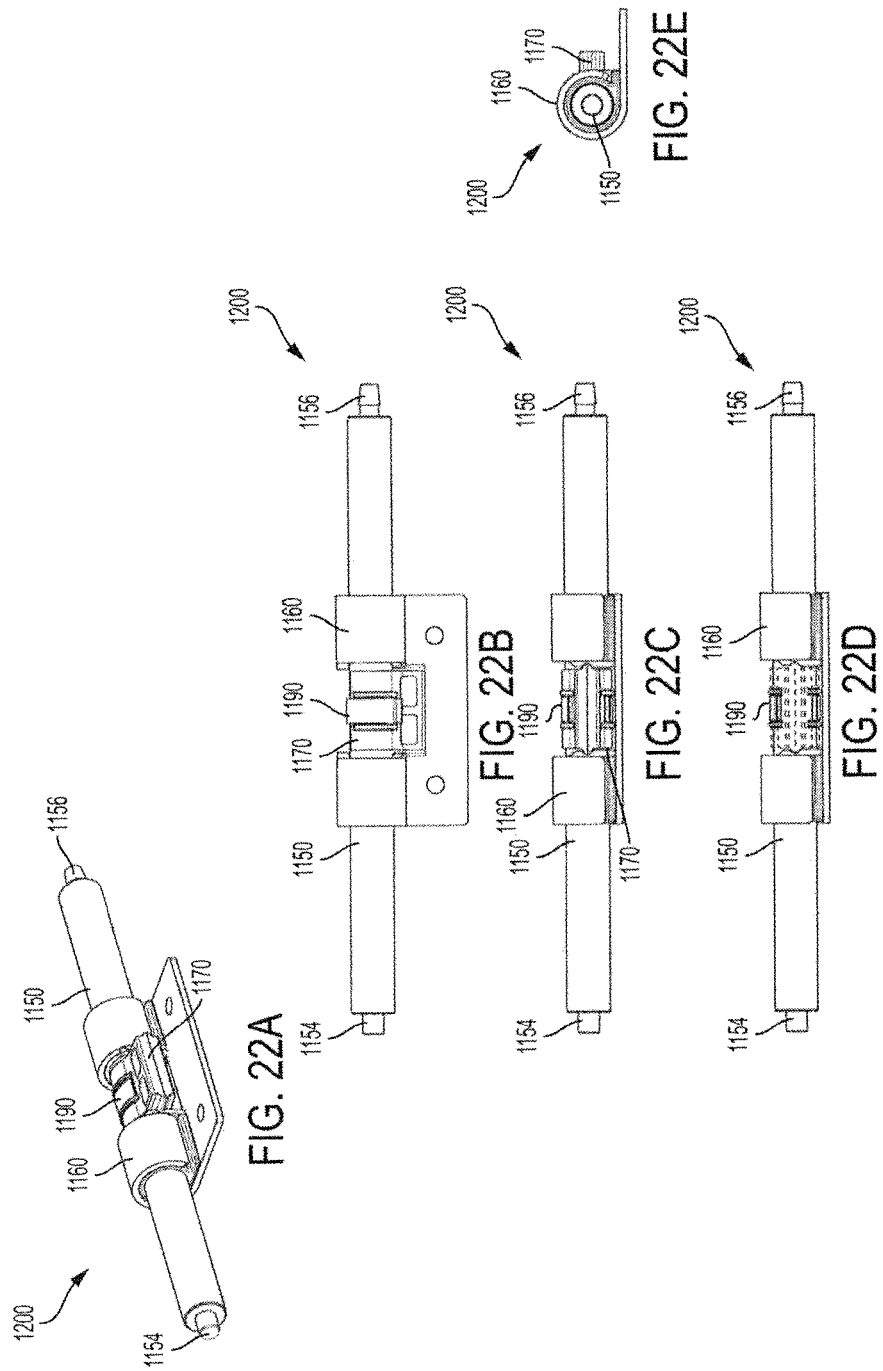

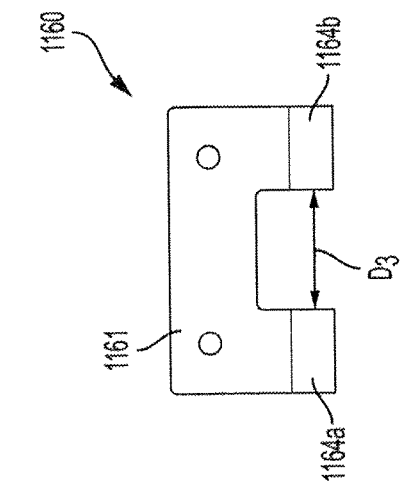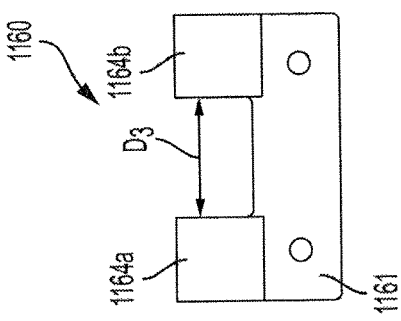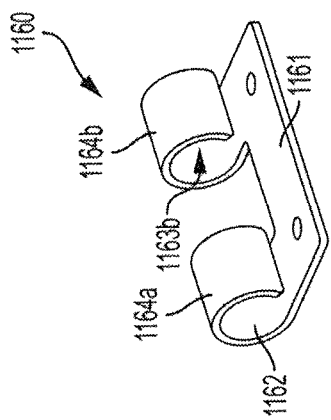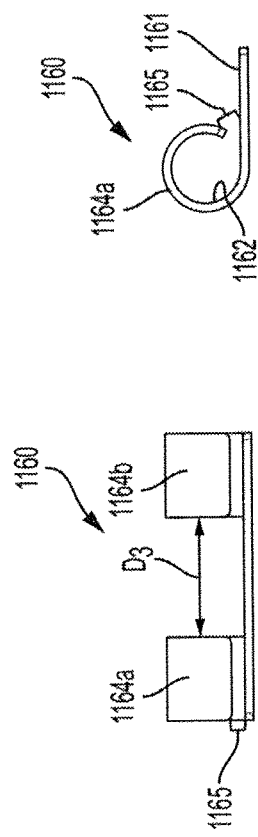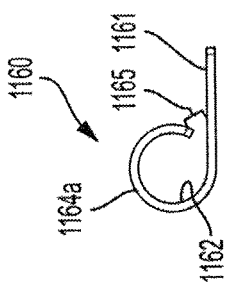

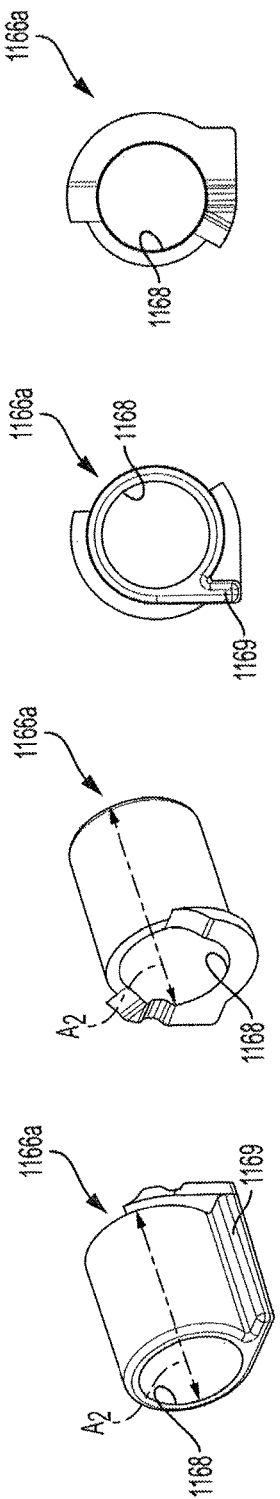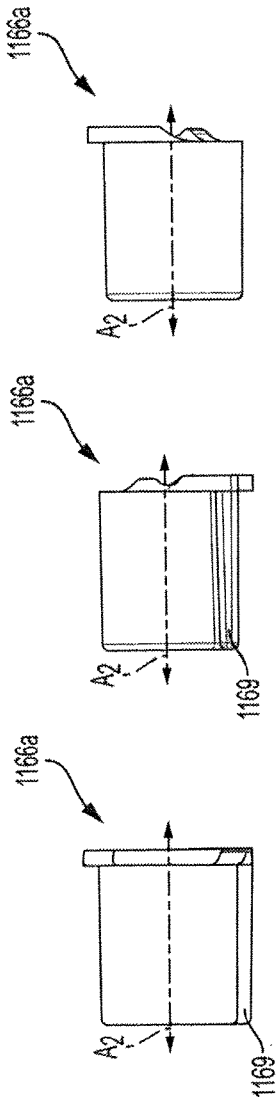

FRICTION MODULE, FRICTION HINGE, AND ADJUSTABLE HEADREST INCLUDING THE FRICTION MODULE AND/OR FRICTION HINGE

This application is a continuation-in-part of, and claims the benefit of priority of, pending U.S. application Ser. No. 15/558,645, filed Sep. 15, 2017, which is the U.S. National Phase Application of PCT Application No. PCT/US2016/022606, filed Mar. 16, 2016, which is related to, and claims the benefit of priority of, U.S. Provisional Application No. 62/133,778, entitled FRICTION MODULE, FRICTION HINGE, AND ADJUSTABLE HEADREST INCLUDING THE FRICTION MODULE AND/OR FRICTION HINGE, filed on Mar. 16, 2015, the contents of each of these applications are incorporated herein by reference in their entirety for all purposes.

BACKGROUND OF THE INVENTION

Passenger seats of vehicles typically include a headrest located at the top of the seat. The purpose of a headrests is increase the safety and comfort of the passenger by providing support to the back of the passenger's head. To accommodate for the differing heights among passengers, headrests are often designed to be adjustable in a vertical direction. Once the headrest is adjusted in the vertical direction, it is desirable to maintain the headrest at the desired height.

Airplane seat headrests face additional design requirements. For example, as commercial airline companies continue to seek new ways to decrease fuel costs, it is advantageous to produce a lightweight headrest that provides sufficient safety and comfort to the passenger. Additionally, headrests that have uncomplicated adjustment mechanisms provide the additional advantage of reducing maintenance time, and thus, increasing the amount of time the airplane is in service.

U.S. Patent Publication No. WO 2016/149341, which is incorporated herein in its entirety for all purposes, provides improvements over previously employed headrest devices. Although significant improvements are achieved with the teachings of U.S. Patent Publication No. WO 2016/149341, further improvements are desired.

SUMMARY OF THE INVENTION

Aspects of the present invention include an adjustable headrest apparatus and systems thereof.

In accordance with a first aspect of the invention, an adjustable headrest includes a guide configured to be coupled to a seat; a head support coupled to the guide and configured to be movable along an adjustment path relative to the seat; and a slider having a surface defining a recess receiving the guide such that the surface of the slider contacts a surface of the guide. A retainer is positioned to urge the surface of the slider against the surface of the guide, thereby maintaining friction between the surface of the slider and the surface of the guide and resisting unintended movement of the slider with respect to the guide along the adjustment path. Additionally, the adjustable headrest includes a bracket that is fixable relative to the head support or fixed relative to the seat. The bracket has a mounting section positioned for fixation relative to the head support or for fixation to the seat and a guide receiving portion receiving the guide. The slider and the bracket are separate components and are formed from the same material or different materials.

According to another aspect of the invention, an adjustable headrest includes a guide configured to be coupled to a seat and having a first end portion and a second end portion opposed the first end portion; a head support coupled to the guide and configured to be movable along an adjustment path relative to the seat; and a bracket fixable or fixed relative to the seat. The bracket has a mounting section fixed or fixable to the seat and a guide receiving portion for receiving the guide. The adjustable headrest further includes a releasable assembly having an engaged configuration and a released configuration. The release assembly limiting movement of the at least one end portion of the guide in the engaged configuration and permitting movement of the at least end portion of the guide in the released configuration.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letters designation may be dropped. Included in the drawings are the following figures:

FIGS. 8A and 8B are perspective views depicting an embodiment of a friction module that may be used in the adjustable headrest depicted in FIG. 1;

FIGS. 9A and 9B are exploded perspective views of the friction module depicted in FIGS. 8A and 8B;

FIGS. 10A-10H depict an embodiment of a slider component that may be used in the adjustable headrest of FIG. 1;

FIGS. 11A-11C depict an embodiment of a guide component that may be used in the adjustable headrest of FIG. 1;

FIGS. 12A-12E depict an embodiment of a retainer component that may be used in the adjustable headrest of FIG. 1;

FIG. 14A is a front view depicting a non-limiting embodiment of an adjustable headrest in accordance with aspects of the invention;

FIG. 14B is a rear perspective view depicting the adjustable headrest of FIG. 14A;

FIGS. 15A-15C are top, side, and bottom views of the adjustable headrest of FIG. 14A;

FIGS. 16A and 16B are front and side views of the adjustable headrest of FIG. 1A with the head support in an upward position;

FIGS. 16C and 16D are front and side views of the adjustable headrest of FIG. 1A with the head support in an center position;

FIGS. 16E and 16F are front and side views of the adjustable headrest of FIG. 1A with the head support in an down position;

FIGS. 18A and 18B are a rear perspective view of the adjustable headrest apparatus of FIG. 14B and the quick release assembly in the engaged configuration;

FIGS. 20A-20E are perspective, front, top, and side views of an exemplary bracket member of the quick release assembly of FIG. 19;

FIGS. 22A-22E are perspective, front, and side views of a non-limiting friction module in accordance with aspects of the invention;

FIGS. 23A-23E are front perspective, front, rear, and side views of the bracket of FIGS. 22A-22F;

FIGS. 24A-24G are front perspective, rear perspective, front, rear, and side views of the first bushing of FIGS. 22A-22F;

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Referring to the figures generally, embodiments of the present invention include friction modules, friction hinges, and adjustable headrest apparatuses. The friction modules may be used in any device where it is desirable to provide friction between components that slide and/or rotate relative to one another. The friction hinges may be employed in any system or apparatus where a hinge may be employed. Embodiments of the friction hinge provide symmetrical or asymmetrical friction upon rotation in different directions. The adjustable headrest may be employed on any seat where a headrest is desired. The adjustable headrest may be configured to include one or more friction modules and/or friction hinges as further described herein.

Figure 1:
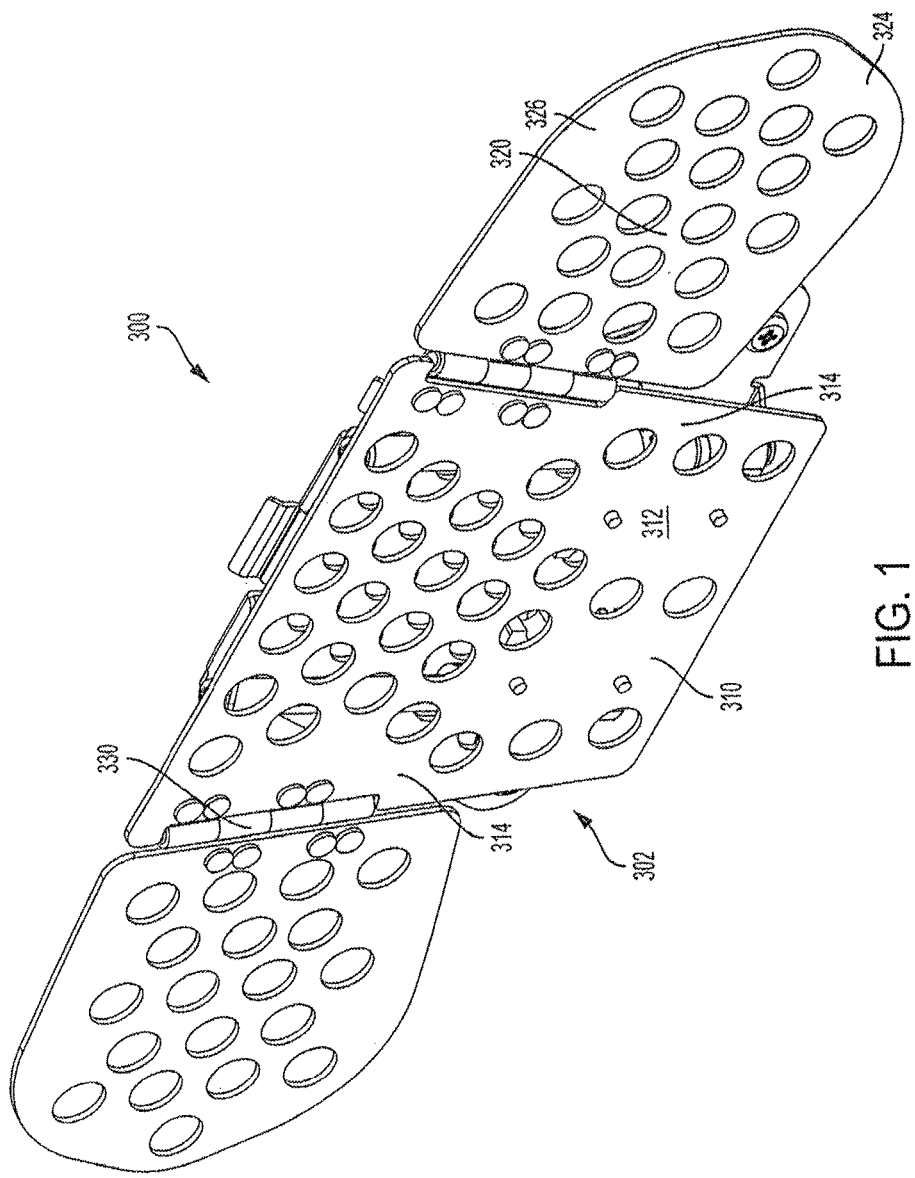
FIG. 1 is a front perspective view depicting an embodiment of an adjustable headrest.
Figure 2:
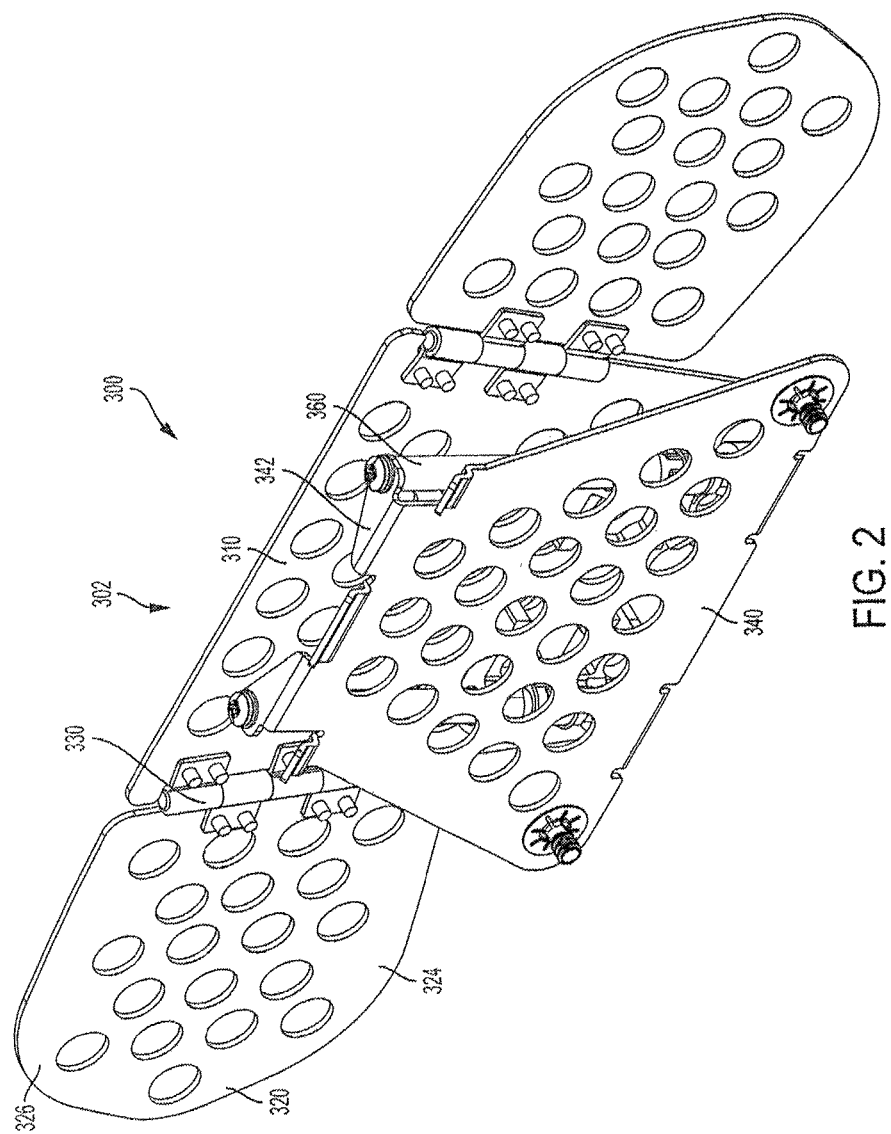
FIG. 2 is a rear perspective view depicting the adjustable headrest of FIG. 1.

FIGS. 1 and 2 depict an embodiment of an adjustable headrest apparatus 300. As a general overview, adjustable headrest 300 may include a head support 302, a guide 360, and a slider 370.

A head support portion 302 of adjustable headrest 300 may include a central portion 310. Central portion 310 has a frontal surface 312 that faces toward a passenger's head. The central portion 310 of the head support 302 may be configured to provide support for the passenger's head. For example, the central portion 310 of head support 302 may have a concave configuration. In one embodiment, upon the passenger positioning his or her head within the concave configuration of central portion 310, one or more side portions 314 of the central portion 310 substantially surround the passenger's head.

In another embodiment, upon the passenger positioning his or her head within the concave configuration of central portion 310, side portions 314 of central portion 310 do not substantially surround the passenger's head. According to preferred embodiments, central portion 310 of the head support 302 substantially surrounds the passenger's head if one or more side portions 314 align with or extend beyond the passenger's ears when the passenger positions his or her head in the concave configuration and is facing forward, away from adjustable headrest 300. By way of further example, as depicted in FIG. 1, the frontal surface 312 of central portion 310 may be flat as to reside within a single plane.

Head support 302 may include one or more wings 320 coupled to the central portion 310 of head support 302. The wings 320 may be attached, directly or indirectly, to central portion 310 of head support 302, e.g., by way of a hinge 330 attaching a side portion 324 of wing 320 to the side portion 314 of central portion 310. Alternatively, the wings 320 may be coupled, directly or indirectly, to central portion 310 of head support 302 by way of attachment to other components of adjustable headrest 300 that are attached and/or coupled to the central portion 310. For example, wings 320 may be coupled to central portion 310 by way of attachment and/or coupling to slider 370, guide 360, and/or other components attached and/or coupled to the central portion 310. Such coupling of components includes direct or indirect coupling such as by direct or indirect connection, affixation, attachment, joining, etc., of one or more components.

Preferably, wings 320 are rotatable with respect to central portion 310. In one embodiment, the at least one wing 320 is coupled for motion about an axis angled with respect to an adjustment path. The axis of rotation of wing 320 may form an angle with respect to a vertical axis. Upon rotation of wing 320 toward the passenger's body, a lower portion 324 of wing 320 may be in an advanced position toward the passenger with respect to an upper portion 326 of wing 320. In one embodiment, lower portion 324 of wing 320 is configured to align with the passenger's neck.

Head support 302 is configured to be moveable along an adjustment path relative to the seat back. Preferably, the adjustment path is in a vertical or near vertical direction, such as by general alignment with a seat back of a seat. Head support 302 is coupled to guide 360 and slider 370. Guide 360 may be positioned to extend in a direction along the adjustment path. Slider 370 is engaged and/or attached to guide 360 to facilitate movement of head support 302 along the adjustment path.

By coupling head support 302 to guide 360 and slider 370, head support 302 is movable along the adjustment path. In one embodiment, head support 302 is attached to the slider 370, and the slider 370 is engaged and/or attached to the guide 360, so that the head support 302 is coupled to guide 360 by way of attachment to slider 370. In this embodiment, slider 370 may be moveable with head support 302 along the adjustment path.

In another embodiment, head support 302 is attached to the guide 360, and the guide 360 is engaged and/or attached to the slider 370, so that head support 302 is coupled to slider 370 by of attachment to guide 360. Pursuant to this embodiment, guide 360 may be moveable with the head support 302 along the adjustment path.

Referring to FIG. 2, an adjustable headrest 300 may include a mounting portion 340 that is configured for attachment to a seat back. The mounting portion 340 is further coupled to head support 302. In one embodiment, mounting portion 340 is coupled to head support 302 by way of attachment to the guide 360. In another embodiment, mounting portion 340 is coupled to head support 302 by way of attachment to the slider 370.

Figure 3:
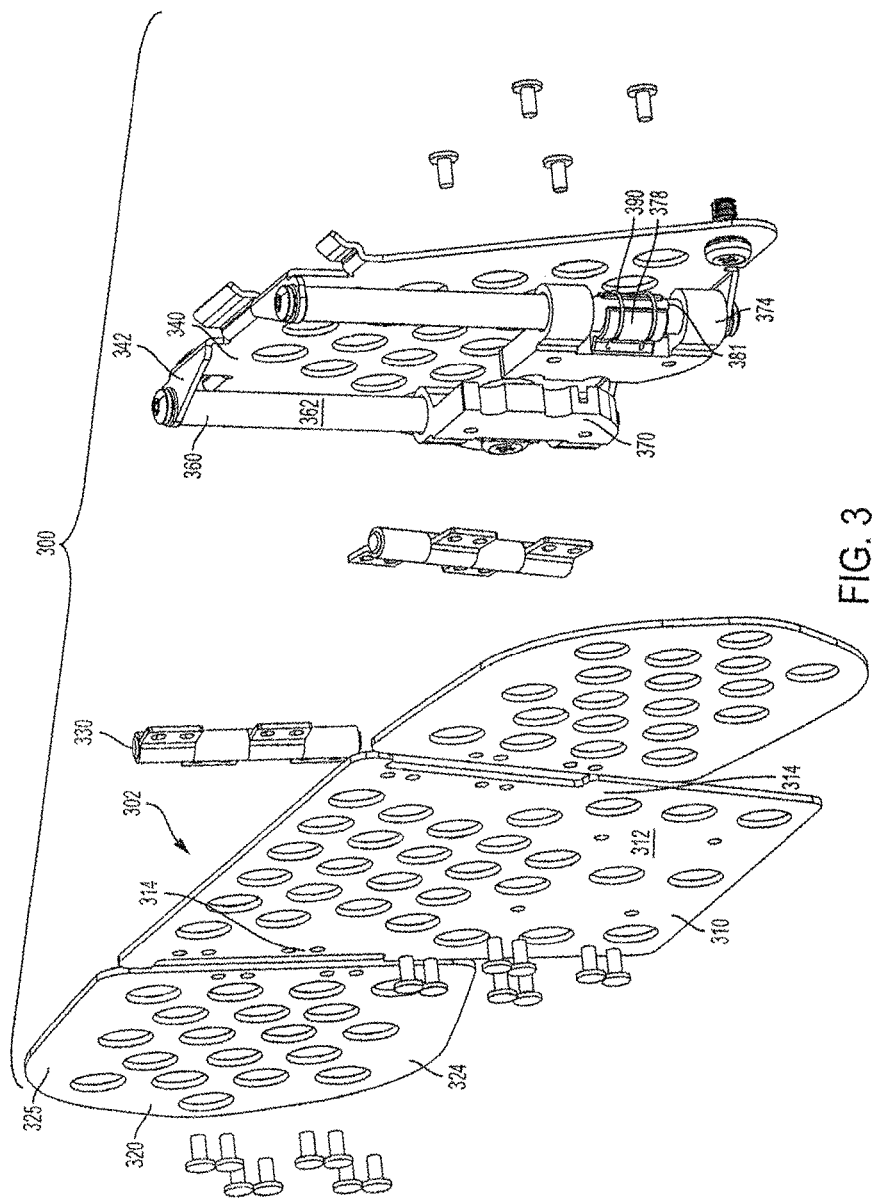
FIG. 3 is an exploded front perspective view depicting the adjustable headrest of FIG. 1 to reveal internal components.

The mounting portion 340 may have an attachment section 342 to facilitate attachment of mounting portion 340 to another component of the adjustable headrest 300 and/or the seat back. Attachment to the mounting portion 340 may be mechanical, such as by welding, riveting, screwing, nailing, bolting, etc., or non-mechanical, such as by adhesives or the like. As shown in FIG. 3, for example, rivets are used for various connections between components of the assembly. For example, rivets are used to fasten hinges of the head support as shown in FIGS. 2 and 3. Although these rivets are not shown as being in a riveted condition in the figures (for example in FIGS. 2 and 3), it will be understood that such rivet fasteners are riveted into place to complete the assembly process.

Implementing mounting portion 340 enables quick and easy coupling of the head support 302 and/or the adjustable headrest 300 to a seat back. Additionally, the mounting portion 340 may protect the internal components of the adjustable headrest 300, e.g., guide 360, slider 370, a retainer 390, and/or any attachments, from various impacts, forces, pressures, vibrations, or the like, received to the mounting portion 340 as the result of employing the adjustable headrest 300 in a vehicle and/or the result of a passenger's actions, e.g., a child hitting or otherwise impacting the back of the seat and/or adjustable headrest 300.

Figure 4A:
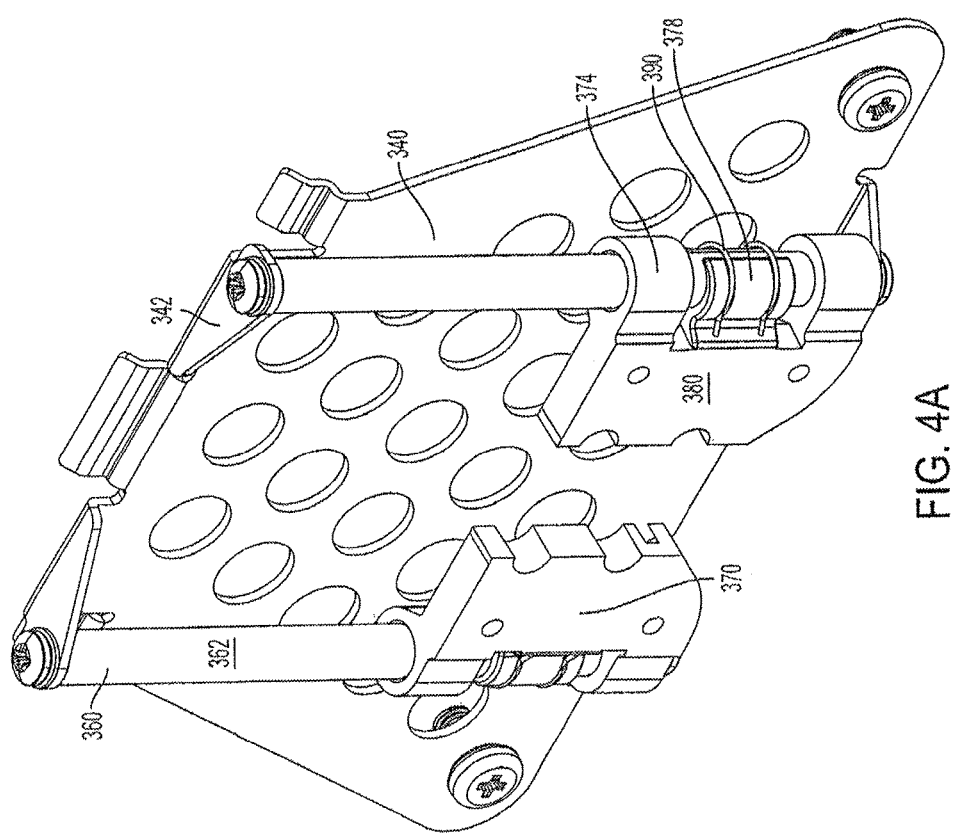
FIG. 4A is a front perspective view depicting a subassembly of components of the adjustable headrest of FIG. 1, in a downward position.
Figure 4C:
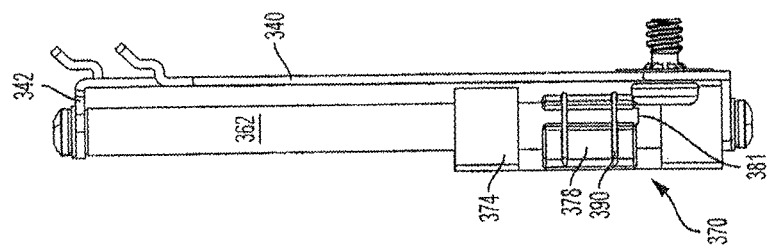
FIG. 4C is a side view depicting the subassembly of FIG. 4A.
Figure 4B:
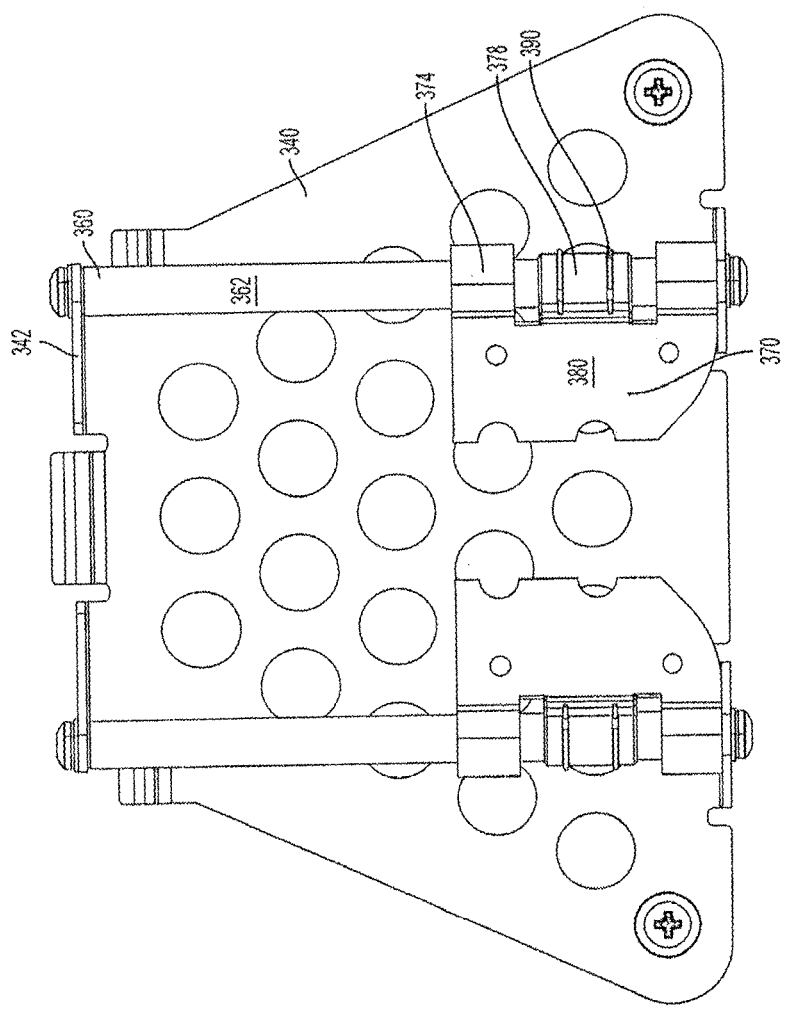
FIG. 4B is a front view depicting the subassembly of FIG. 4A.

FIGS. 4A-4C depict the internal components of an exemplary adjustable headrest 300 having a mounting portion 340. In this embodiment, mounting portion 340 is coupled to the sliders 370 by way of attachment to guides 360. Sliders 370 are in a downward position with respect to the adjustment path. Although not illustrated in FIGS. 4A-4C, a head support 302 may be coupled and/or attached to sliders 370.

Figure 5A:
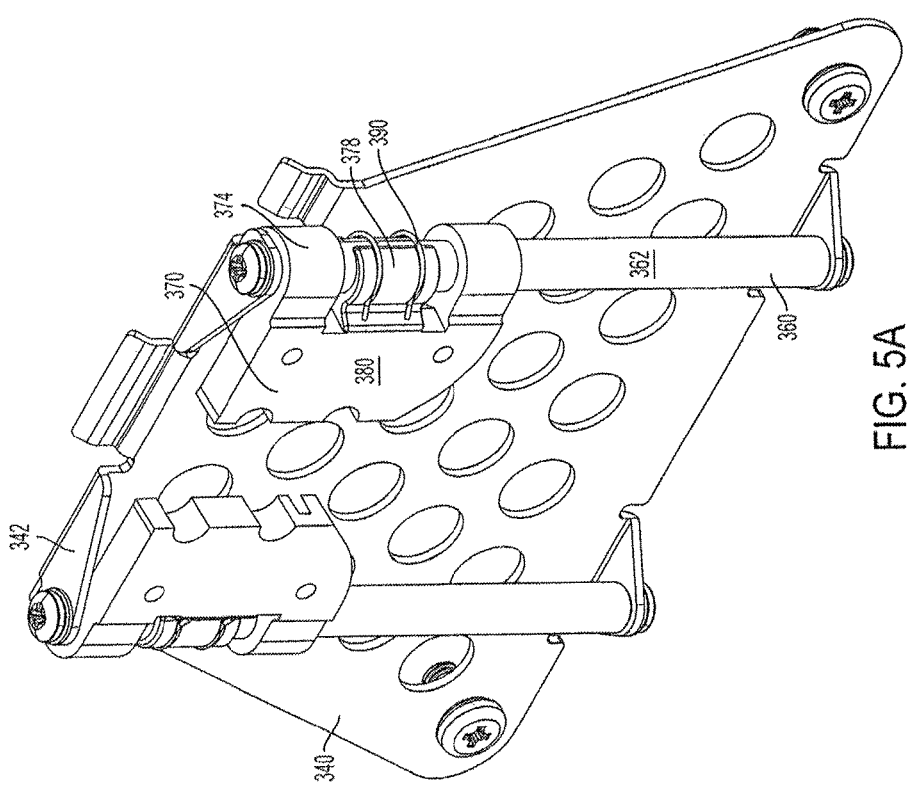
FIG. 5A is a front perspective view depicting the subassembly of FIG. 4A, in an upward position.
Figure 5C:
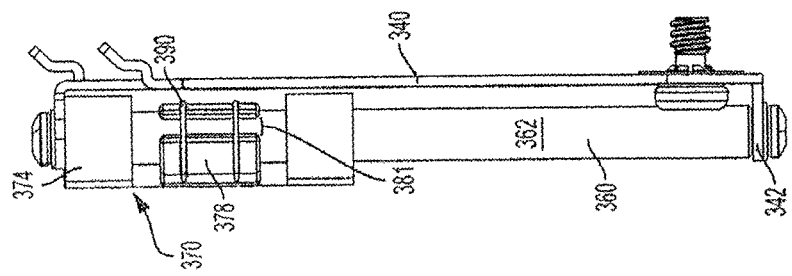
FIG. 5C is a side view depicting the subassembly of FIG. 5A.
Figure 5B:
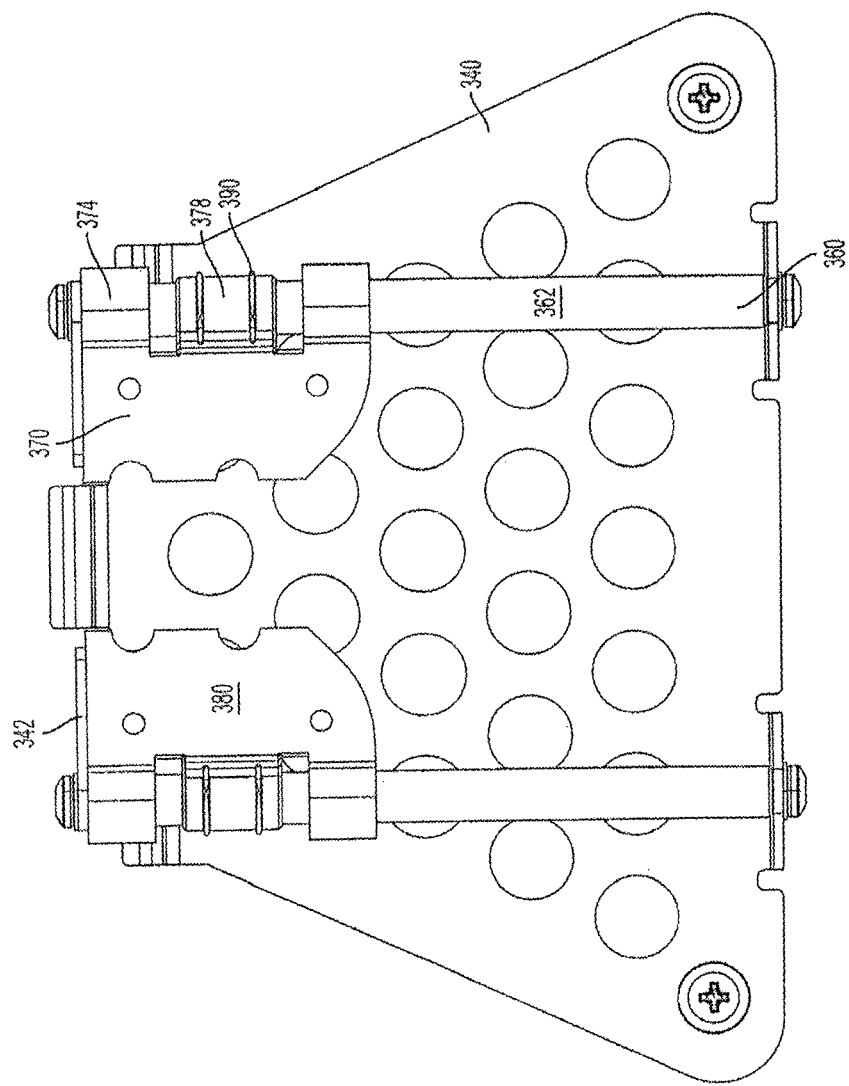
FIG. 5B is a front view depicting the subassembly of FIG. 5A.
Figure 6B:
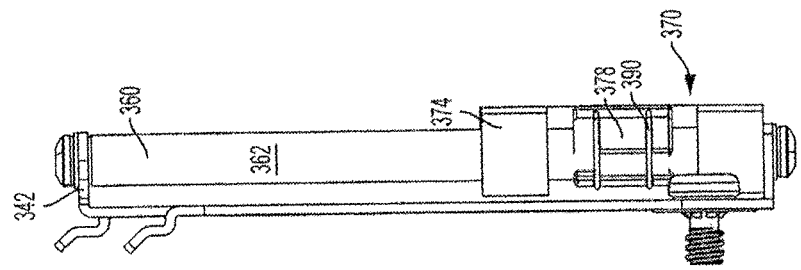
FIG. 6B is a side view depicting the subassembly of FIG. 6A.
Figure 6A:
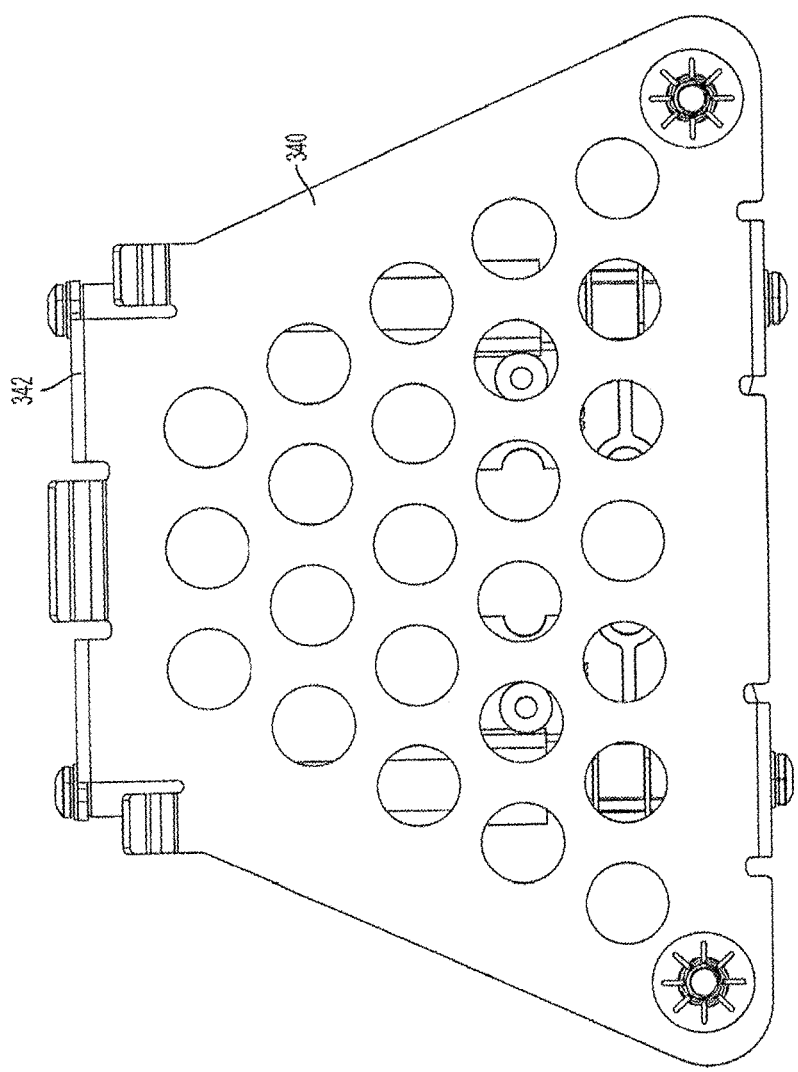
FIG. 6A is a rear view depicting the subassembly of FIG. 4A, in a downward position.

FIGS. 5A-5C also depict the internal components of an adjustable headrest 300 having a mounting portion 340. Unlike FIGS. 4A-4C, the sliders 370 depicted in FIGS. 5A-5C are in an upward position. Sliders 370 may be positioned at any point along the adjustment path between the upward position and the downward position. Accordingly, in embodiments where the head support 302 is coupled and/or attached to sliders 370, the head support 302 may also be positioned at any point along the adjustment path between the upward and downward positions.

In other embodiments, guide 360 is moveable along the adjustment path between the upward and downward positions. In embodiments where a mounting portion 340 is also employed, mounting portion 340 may be coupled to guide 360 by way of attachment to slider 370. Accordingly, the guide 360 may be moveable between the upward and downward positions along the adjustment path with respect to slider 370 and mounting portion 340. A head support 302 may be coupled and/or attached to guide 360 to enable head support 302 to be positioned at any point along the adjustment path between the upward and downward positions.

The head support 302 may be configured to rotate about a pivot axis that is defined by a pivot device (not shown). The pivot axis may be angled with respect to the adjustment path, thereby permitting pivotal movement of the head support 302 with respect to the seat about the pivot axis. In one embodiment, the pivot axis is perpendicular to the adjustment path. In another embodiment, the pivot axis is parallel to the top of the seat back.

The pivot device may be employed to enable the head support 302 to rotate toward and/or away from the passenger's head. The pivot device may be designed as a hinge, such as the rotational hinge described herein, or any other device and/or mechanism that enables pivoting or rotation about an axis. Preferably, the pivot device is attached and/or coupled to the head support 302 and a component of the adjustable headrest 300 that is also moveable along the adjustment path. In one embodiment, the pivot device is attached and/or coupled to head support 302 and slider 370, thereby enabling the head support 302 to be moveable along the adjustment path and rotatable about the pivot axis. In another embodiment, the pivot device is attached and/or coupled to head support 302 and guide 370, thereby enabling the head support 302 to be moveable along the adjustment path and rotatable about the pivot axis.

Figure 7:
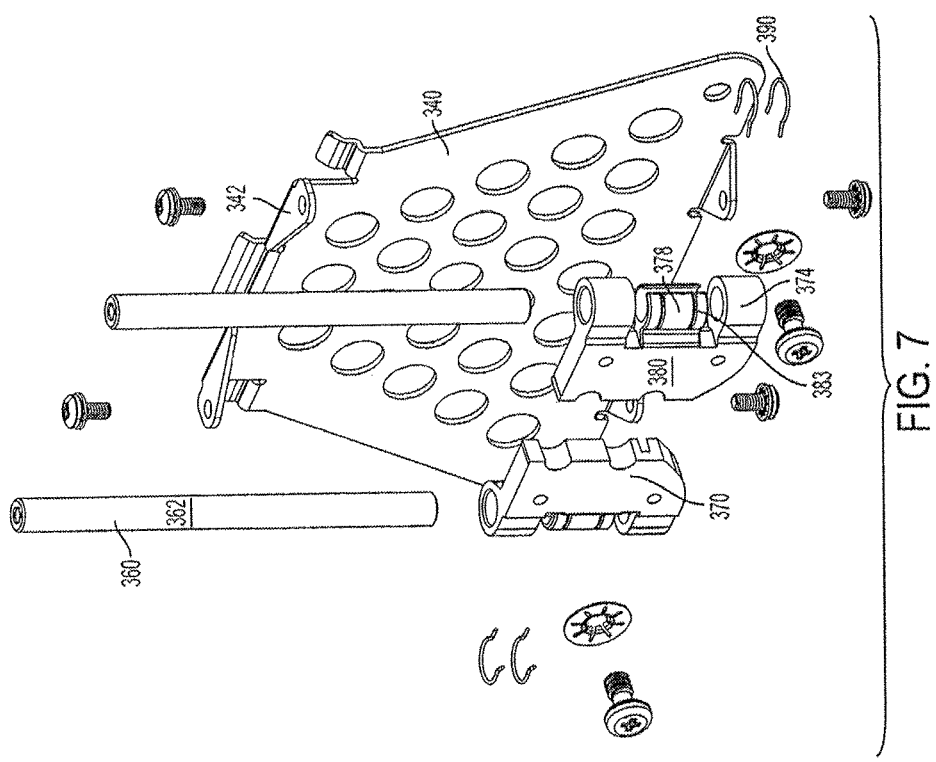
FIG. 7 is an exploded front perspective view of the subassembly of FIG. 4A.

Referring to FIGS. 7-9, exemplary internal components of an adjustable headrest 300 are further disclosed hereafter. The internal components of adjustable headrest 300 may include a friction module 100, which further includes a guide 360 and a slider 370. The friction module 100 may also include one or more retainers such as a retainer 390. Although the friction module 100 is described with reference to an embodiment configured for adjustable headrest 300, one of skill in the art would readily recognize the various applications of friction module 100 in other apparatuses, devices, and/or systems based on the description herein. For example, friction module 100 would be highly advantageous in any device where a predetermined and modifiable amount of friction is desired between two or more components that slide and/or rotate with respect to one another. For example, a friction module (such as friction module 100 for example or modifications of friction module 100) would be highly advantageous when used with sliding components of various types of assemblies in various industries and applications. Illustrative examples include furnishings, arm rests, tray tables, extensions, adjusters, and any other assembly in which two or more components slide and/or rotate with respect to one another along or about a path or axis.

Referring to 10A-10H, slider 370 has an inner surface 372 that defines a recess 371 for receiving guide 360. The inner surface 372 of the slider 370 may be in contact with the outer surface 362 of guide 360 upon the recess 371 receiving guide 360. Slider 370 may be configured to have two or more separate inner surfaces 372 defining one or more recesses 371 that contact guide 360. In one embodiment, the two or more separate inner surfaces 372 of slider 370 define a single recess 371. In another embodiment, the two or more separate inner surfaces 372 of slider 370 define two or more recess 371.

Additionally or alternatively, the one or more recesses 371 of slider 370 may receive one or more guides 360. For example, a single slider 370 defining two recesses 371 on either end of the slider 370 may be positioned between two guides 360 so that each recess 371 receives a different guide 360. By way of another example, more than one slider 370 defining one or more recesses 371 may be engaged and/or attached to more than one guides 360, wherein each slider 370 receives only one guide 360. In one embodiment, the plural guides 360 are configured to be coupled to the seat and each of the recesses 371 defined by inner surfaces 372 of the slider 370 receives one of the guides 360. Upon receiving guide 360 in recess 371, slider 370 may be engaged and/or attached to guide 360.

Slider 370 and/or guide 360 may rotate and/or slide with respect to each other. In one embodiment, slider 370 is prevented from rotation relative to guide 360 about the longitudinal axis of guide 360. For example, the slider 370 may be coupled to head support 302 to prevent slider 370 from rotating with respect to guide 360. By way of further example, the inner surface 372 of slider 370 may be configured to have a portion of inner surface 372, e.g., a protrusion, that engages a portion of outer surface 362 of guide 360, e.g., an indent or groove, to prevent rotation of slider 370 with respect to guide 360. In another embodiment, slider 370 is prevented from sliding along the length 364 of guide 360. According to a further embodiment, slider 370 may simultaneously rotate around guide 360 and slide along the length 364 of guide 360.

The slider 370 may delineate a gap 381 extending from the recess 371 to an outer surface 380 of slider 370, thereby permitting compression of the slider 370 to increase the friction between the inner surface 372 of the slider 370 and the outer surface 362 of the guide 360. The gap 381 enables slider 370 to be deformed without employing substantial force and/or forming the slider 370 from highly deformable material(s). Accordingly, slider 370 may be formed from a durable material, such as a plastic material and/or metallic material. In one embodiment, slider 370 is formed from a plastic material.

The slider 370 may be configured to have sections integrally formed from, attached, and/or coupled to slider 370. For example, slider 370 may include a block section 374 having an inner surface 376 that defines a recess 373. The recess 373 defined by inner surface 376 of block section 374 may also be an aperture, whereby a guide 360 is received. Block section 374 may be configured without a gap to facilitate compression of the block section 374. Accordingly, the inner surface 376 of block section 374 may provide minimal amounts of friction with outer surface 362 of guide 360.

Block section 374 may be configured to facilitate insertion of guide 360 into recess 373 and/or recess 371 during manufacturing, repair, etc. Block section 374 may also be configured to protect the slider 370 and/or a friction section 378 from impacts with other components of adjustable headrest 300, e.g., the attachment section 342 of mounting portion 340, which may result from adjustment of the head support portion 302 along the adjustment path, e.g., as a passenger moves the adjustable headrest 300 with respect to the seat. Block section 374 may provide additional strength to resist disengagement and/or detachment of slider 370 and guide 360. It may also serve to align the guide with respect to the slider such that the recess(es) formed by the slider extend along the same axis as the guide.

The slider 370 may also be configured to include a friction section 378, wherein the inner surface 372 of the friction section 378 defines a recess 371 that contacts the outer surface 362 of the guide 360 to produce an amount of friction. In one embodiment, the slider 370 is solely the friction section 378. The recess 371 defined by inner surface 372 of friction section 378 may be part of the recess 373 defined by inner surface 376 of block section 374. In one embodiment, the majority of the friction produced by slider 370 is produced by the contact of inner surface 372 of friction section 378 to outer surface 362 of guide 360. The friction section 378 may be formed of a material different from another portion or section of the slider 370.

The slider 370 may be configured to produce varying amounts of friction, e.g., by employing one or more retainers 390 of different shapes and/or materials. The slider 370 has an outer surface 380 that may define grooves 383. The grooves 383 may be positioned to at least partially receive a retainer 390. Additionally, outer surface 380 of slider 370 may define one or more grooves 383 to at least partially receive one or more retainers 390. The depth (not shown) of grooves 383 may vary along the length of grooves 383. The depth of grooves 383 may be varied to form a notch-receiving portion (not shown) that engages a portion of retainer 390, e.g., a notch portion 398 of retainer 390, to increase the amount of force required remove the retainer 390 from groove 383.

Although such groove(s) are optionally provided in the surface of the slider to hold or engage or otherwise at least partially receive one or more retainer, the retainer(s) on the slider(s) could alternatively be clamps or bands at least partially surrounding the slider(s). In such embodiments, the groove(s) can be eliminated.

Depicted in FIGS. 11A-11C, guide 360 has an outer surface 362 and length 364. The guide 360 may be configured to have a variety of cross-sectional shapes such as a cylinder, a triangle, a rectangle, a hexagon, or any other shape. By providing a non-cylindrical guide, relative rotation of the guide within the slider can be limited or prevented.

Referring to FIGS. 12A-12E, a retainer 390 may be positioned to contact at least a portion of the periphery, e.g., the outer surface 380, of slider 370 and/or friction section 378 of slider 370. Retainer 390 may have a shape configured to extend along the outer surface 380 of slider 370. The retainer 390 may include end portions 396 and a middle portion 394 having one or more curvatures. The one or more curvatures of middle portion 394 may extend from a first end portion 396 to a second end portion 396.

In one embodiment, middle portion 394 has a curvature that is C-shaped, i.e., the retainer 390 has the general shape of the letter "c," which is not to be limited to any specific font, size, and/or capitalization. The end portions 396 may extend in the projected direction of the middle portion 394 as to form an extension of the middle portion 394. Alternatively, the end portions 396 may extend in a direction away from the projected direction of the middle portion 394. For example, end portions 396 may extend outwardly, away from the center of the curvature of middle portion 394.

In one embodiment, the curvature of middle portion 394 and the end portions 396 together form an omega-shape, i.e., the retainer 390 has the general shape of the Greek letter "Ω," which is not to be limited to any specific font, size, and/or capitalization. In another embodiment, a notch portion 398 is formed at the point of connection between middle portion 394 and end portions 396 by the end portions 396 extending in a direction that forms an angle with the projected direction of the middle 394. The end portions 396 may also extend inward with respect to the one or more curvatures of middle section 394. Preferably, retainer 390 has a shape configured to extend along outer surface 380 of slider 370. For example, retainer 390 may be configured to be received by grooves 383 of outer surface 380 of slider 370 and/or friction section 378 of slider 370.

If the retainer 390 is provided with a "C" or omega shape, the friction section 378 is also preferably provided with a corresponding "C" or omega shape. In other words, the outer surface of the friction section 378, or the inner surface of the grooves 383, are preferably provided with a shape corresponding generally to that of the retainer 390 in order to provide substantially uniform contact and to evenly distribute the forces generated by the retainer 390 against the friction section 378. Alternatively, separate contact surfaces can be provided for one or more point or area contacts between the friction section 378 and the retainer 390.

Retainer 390 may be employed to urge the inner surface 372 of slider 370 and/or friction section 378 against the outer surface 362 of guide 360, thereby maintaining friction between inner surface 372 of the slider 370 and outer surface 362 of guide 360. By employing retainer 390, unintended movement between slider 370 and guide 360 along the adjustment path may be resisted and/or prevented. For example, resisting and/or preventing unintended movement between slider 370 and guide 360 includes providing sufficient friction to maintain the position of adjustable headrest 300 under forces such as: the forces produced by gravity, e.g., on head support 302 and other components of adjustable headrest 300 that are not fixed along the adjustment path with respect to the seat; forces produced by the vehicle's movement, e.g., vibrations, acceleration, deceleration, bumps or jolts, and/or take-off and landings; and forces produced by the passenger that were not intended to adjust the adjustable headrest 300, e.g., movement of the passenger's head while his or her head is contacting head support 302 and/or lightly bumping into adjustable headrest 300. Retainer 390 may be formed of various materials including plastics and or metallic compounds. In one embodiment, retainer 390 is formed from a metallic material.

The slider 370 may be configured to support one or more retainers 390, whereby the friction between the inner surface 372 of the slider 390 and the surface 362 of the guide 360 is increased by adding the one or more additional retainers 390. In one embodiment, the outer surface 380 of the slider 370 defines plural grooves 383 positioned to at least partially receive the retainers 390.

By employing guide 360, slider 370, and/or retainer 390, friction module 100 and/or adjustable headrest 300 may be configured to have an amount of friction between the inner surface 372 of the slider 370 and the outer surface 362 of the guide 360 as the slider 370 is moved relative to the guide 360 along the adjustment path that is within a predetermined range, thus providing a range of force needed to move the guide and slider with respect to one another. Additionally, the predetermined range of force may be maintained after a predetermined number of cycles of movement of the slider 370 relative to the guide 360 along the path. In one embodiment, the materials used in the guide 360, the slider 370, and/or the retainer 390 are selected so that the predetermined range of friction is maintained over a predetermined range of temperatures.

For example, a friction module such as friction module 100 and/or an adjustable headrest such as adjustable headrest 300 may be configured to have a force range of 3-6 lb. such that a force in that range is required to slide the components with respect to one another along the adjustment path. A sliding force within the force range can be provided by a single guide and a single slider or collectively by a combination of guides and sliders. For example, a sliding force within the force range can also be provided by a single guide and plural sliders on that guide, or by plural guides and plural sliders on the guides. Each such guide and slider would therefore be configured to provide a predetermined sliding force, either alone or in combination with one or more other guides and sliders.

Such a predetermined range of forces is preferably maintained over a substantial product life, during which the relative position of the components are cycled in each movement. For example, even after a predetermined number of cycles of movement of the slider 370 relative to the guide 360 along the path, the force required to move the slider 370 relative to the guide 360 preferably remains within a predetermined range of forces. While various numbers of cycles can be selected, a number of cycles is optionally selected within a range of 10,000-20,000.

Such a predetermined range of forces is also preferably maintained over a substantial temperature range, recognizing that the relative position of the components may be changed in various temperature environments. For example, even over a substantial temperature range, the force required to move the slider 370 relative to the guide 360 preferably remains within a predetermined range of forces. While various temperature ranges can be selected, one exemplary temperature range is −20° C. to +40° C.

Adjustable headrest 300 may also include one or more rotational hinges. Rotational hinges may be employed, e.g., to enable rotation of wings 320 with respect to central portion 310 and/or as a pivot device to enable pivoting and/or rotation of head support 302 with respect to the pivot axis.

Whether part of a headrest or separate for use as part of another assembly, rotational hinges may include a shaft (such as guide 360 in FIGS. 8A-9B) having a longitudinal axis extending along the pivot axis (such as the longitudinal axis of guide 360) and a hinged component (such as slider 370 in FIGS. 8A-9B) having an inner surface (such as inner surface 372 in FIGS. 9A and 9B). The surface of the hinged component defines a recess (such as recess 371 in FIGS. 9A and 9B) configured to receive the shaft, whereby the inner surface of the hinged component contacts a surface (such as outer surface 362 in FIGS. 8A-9B) of the shaft. The hinged component may be rotatable relative to the shaft about the pivot axis in opposite directions. The hinged component may be prevented from sliding relative to the shaft along the longitudinal axis of the shaft.

The hinged component may be configured to define a gap (such as gap 381 in FIGS. 9A-9B) extending from the recess defined by the inner surface to an outer surface (such as outer surface 380 in FIGS. 9A-9B) of the hinged component. The gap enables compression of the hinged component to increase the friction between the surface of the hinged component and the surface of the shaft such that the surface of the hinged component contacts a surface of the shaft. The friction generated between the hinged component and the shaft may be sufficient to resist unintended movement of the hinged component relative to the shaft about the pivot axis.

The rotational hinge may be configured to produce asymmetrical friction torque; e.g., the friction produced by rotating the hinged component in a first rotational direction may be unequal to the friction produced by rotating the hinged component in a second rotational direction. Such optional asymmetric torque is advantageous for applications in which it is desired to require a force to rotate a hinged component in a first rotation direction and a larger force to rotate the hinged component in a second or opposite direction. For example, the wings of the headrest assembly illustrated in FIG. 1 are preferably harder to move rearwardly (away from the user's head) in order to provide head support as compared to forwardly (toward the head). In other words, the force required to rotate the wings rearwardly is preferably greater than the force required to rotate them forwardly, thus providing improved head support while still facilitating adjustment of the wing positions.

In one embodiment, the gap extending from the recess to the outer surface of the hinged component may be positioned to provide asymmetric friction torque when the hinged component is rotated in different directions.

In another embodiment, the recess defined by the surface of the hinged component may be configured and/or positioned to provide asymmetric friction torque when the hinged component is rotated in the opposite directions. In yet a further embodiment, a thick portion of the hinged component that defines the recess has a greater thickness than a thin portion of the hinged component, whereby compression of the hinge component compresses the thin portion of the hinged component more than the thick portion of the hinged component to provide asymmetric friction torque. The asymmetrical friction torque generated between the hinged component and the shaft may be increased by utilizing one or more retainers 390.

One or more retainers 390 may be employed to increase the friction generated between the hinged component and the shaft. The retainers 390 may be configured as described herein with respect to the friction module 100 and/or adjustable headrest 300. Additionally, various modifications of retainers 390 pursuant to the specific application of the rotational hinge will be understood by one of skill in the art from the description herein.

As noted previously in connection with friction module 100 and adjustable headrest 300, a rotational hinge may be configured to have an amount of friction within a predetermined range, thus providing a range of force needed to rotate its components with respect to one another. Additionally, the predetermined range of force may be maintained after a predetermined number of cycles of rotation of the components. Also, the materials used in the rotational hinge are preferably selected so that the predetermined range of friction is maintained over a predetermined range of temperatures.

For example, a rotational hinge may be configured to have a predetermined force range such that a force in that range is required to rotate the components with respect to one another about a pivot axis. A rotational force within the force range can be provided by a single rotational hinge or collectively by a combination of hinges. Each such rotational hinge would therefore be configured to provide a selected rotational force, either alone or in combination with one or more other rotational hinges.

A predetermined range of rotational force is preferably maintained over a substantial product life, during which the relative position of the components are cycled in each movement. For example, even after a predetermined number of cycles of rotation, the force required to rotate components of the rotational hinge with respect to one another preferably remains within a predetermined range of forces. While various numbers of cycles can be selected, a number of cycles is optionally selected within a range of 10,000-20,000.

A predetermined range of rotational force is also preferably maintained over a substantial temperature range, recognizing that the relative position of the components may be changed in various temperature environments. For example, even over a substantial temperature range, the force required to rotate components of the rotational hinge preferably remains within a predetermined range of forces. While various temperature ranges can be selected, one exemplary temperature range is −20° C. to +40° C.

Figure 13A:
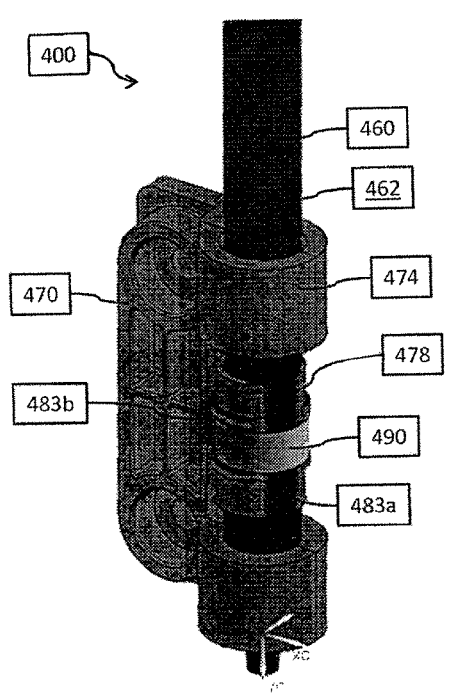
FIGS. 13A and 13B are perspective views of another embodiment of a friction module with and without a retainer, respectively, in accordance with aspects of the invention.
Figure 13B:
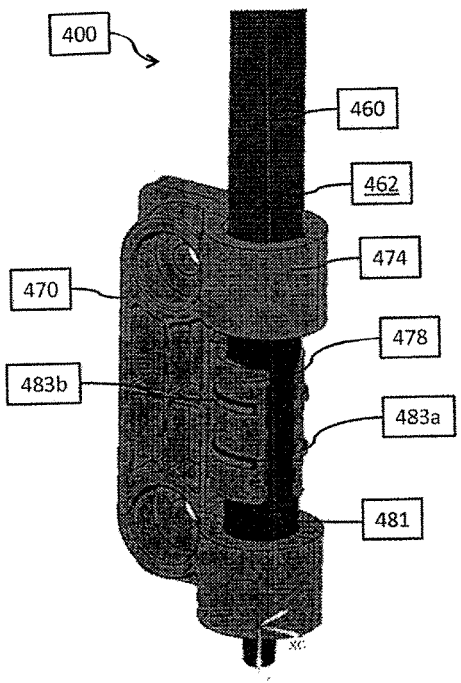

Referring to FIGS. 13A and 13B, illustrated is another embodiment of a friction module 400 in accordance with aspects of the invention. As a general overview, the friction module 400 includes a guide 460 and a slider 470. The friction module 400 may also include one or more retainers 490. As illustrated in FIG. 13A, retainer 490 is configured to be a retainer band. Friction module 400 may be highly advantageous in any device where a predetermined and modifiable amount of friction is desired between two or more components that slide and/or rotate with respect to one another. For example, a friction module 400 would be highly advantageous when used with sliding components of various types of assemblies in various industries and applications, such as furnishings, arm rests, tray tables, extensions, adjusters, etc.

The guide 460 has an outer surface 462 extending along a longitudinal axis of the guide 460. The slider 470 and/or guide 460 may rotate and/or slide with respect to each other. In one embodiment, the slider 470 is prevented from rotation relative to the guide 460 around the longitudinal axis of guide 460. In another embodiment, the slider 470 is prevented from sliding along a length of guide 460 and/or in the direction of the longitudinal axis of guide 460. According to a further embodiment, the slider 470 may simultaneously rotate around the guide 460 and slide along the length and/or in the direction of the longitudinal axis of the guide 460.

The slider 470 includes a block section 474 and a friction section 478. Block section 474 and friction section 478 each define a recess adapted to receive guide 460. Block section 474 may be configured to protect the slider 470 and/or a friction section 478 from impacts with objects, e.g., components of adjustable headrest 300 when friction module 400 is employed in adjustable headrest 300.

Friction section 478 has an inner surface that defines a recess that contacts the outer surface 462 of the guide 460 to produce an amount of friction. Friction section 478 delineates a gap 481 extending from the recess defined by the friction section 478 to an outer surface of the friction section 478, thereby permitting compression of the friction section 478 to increase the friction between the inner surface of the friction section 478 and the outer surface 462 of the guide 460. The gap 481 enables friction section 478 to be deformed without employing substantial force and/or forming the friction section 478 from highly deformable material(s). For example, one or more retainers 490 of different shapes and/or materials may be disposed on friction section 478 to increase the amount of friction produced between the inner surface of the recess defined by the friction section 478 and outer surface 462 of the guide 460.

The friction section 478 of slider 470 has an outer surface that defines a plurality of protrusions 483. The protrusions 483 may be configured to at least partially receive at least one retainer 490, e.g., between protrusion 483a and protrusion 483b. In one embodiment, retainer 490 contacts both protrusion 483a and protrusion 483b upon being positioned on friction section 478 between protrusion 483a and 483b.

A kit for an adjustable headrest may include one or more of the aforementioned components of the adjustable headrest 300 including a friction module 100 and/or a rotational hinge as described herein. The kit for an adjustable headrest may further include a pivot device and one or more cushions (not shown) and/or covering materials (not shown). The one or more cushions and/or covering materials may be coupled to the head support portion 302. Suitable techniques for employing one or more cushions or covering materials to the adjustable headrest 300 for providing additional comfort to a user will be understood by one of skill in the art from the description herein.

Additionally, one of skill in the art would understand how to assemble the adjustable headrest kit based on the drawings and description provided herein. Embodiments of kits for adjustable headrest 300 enable an assembler to increase or decrease the force required by a user to adjust the head support 302 along the adjustment path by increasing or decreasing the friction produced between inner surface 372 of the slider 370 and the outer surface 362 of the guide 360.

One exemplary method for increasing or decreasing the friction produced between inner surface 372 of the slider 370 and the outer surface 362 of the guide 360 includes adding or removing retainers 390 to slider 370. Another exemplary method includes replacing one or more retainers 390 with one or more retainers 390 formed of a different material or having a different shape. Yet, another exemplary method includes replacing the guide 360 and/or slider 370 with a guide 360 and/or slider 370 of a different material and/or shape.

FIGS. 14A-15C depict an embodiment of an adjustable headrest apparatus 1100. As a general overview, adjustable headrest 1100 may include a head support 1102, a guide 1150, and a slider 1170.

A head support portion 1102 of adjustable headrest 1100 may include a central portion 1110. Central portion 1110 has a frontal surface 1112 that faces toward a passenger's head. Central portion 1110 of head support 1102 may be configured to provide support for the passenger's head. For example, central portion 1110 of head support 1102 may have a concave configuration. In one embodiment, upon the passenger positioning his or her head within the concave configuration of central portion 1110, one or more side portions 1114 of central portion 1110 substantially surround the passenger's head.

In another embodiment, upon the passenger positioning his or her head within the concave configuration of central portion 1110, side portions 1114 of central portion 1110 do not substantially surround the passenger's head. According to preferred embodiments, central portion 1110 of head support 1102 substantially surrounds the passenger's head if one or more side portions 1114 align with or extend beyond the passenger's ears when the passenger positions his or her head in the concave configuration and is facing forward, away from adjustable headrest 1100. By way of further example, as depicted in FIGS. 15A and 15C, frontal surface 112 of central portion 110 may be flat as to reside within a single plane. In the embodiment illustrated in FIGS. 15A-15C, central portion 1110 includes a first attachment section 1116a and a second attachment section 1116b. At least one of the attachment sections 1116a and/or 1116b includes an attachment section 1116 defining a guide receiving slot 1118 originating from an entrance 1119.

Head support 1102 may include one or more wings 1120 coupled to central portion 1110 of head support 1102. Wings 1120 may be attached, directly or indirectly, to central portion 1110 of head support 1102, e.g., by way of a hinge 1122 attaching a side portion 1124 of wing 1120 to side portion 1114 of central portion 1110. Alternatively, wings 1120 may be coupled, directly or indirectly, to central portion 110 of head support 1102 by way of attachment to other components of adjustable headrest 1100 that are attached and/or coupled to central portion 1110. For example, wings 1120 may be coupled to central portion 1110 by way of attachment and/or coupling to slider 1170, guide 1150, and/or other components attached and/or coupled to the central portion 310. Such coupling of components includes direct or indirect coupling such as by direct or indirect connection, affixation, attachment, joining, etc., of one or more components.

Referring to FIGS. 17A-17I, wings 1120 may be rotatable with respect to central portion 1110. For example, wings 1120 may form an angle with respect to central portion 1110, or a plane defined therefrom, of 15°, 45°, 90° or any angle therebetween. In one embodiment, at least one wing 1120 is coupled for motion about an axis that is angled with respect to an adjustment path. The axis of rotation of wing 1120 may form an angle with respect to a vertical axis. Upon rotation of wing 1120 toward the passenger's body, a lower portion 1124 of wing 1120 may be in an advanced position toward the passenger with respect to an upper portion 1126 of wing 1120. In one embodiment, lower portion 1128 of wing 1120 is configured to align with the passenger's neck.

Head support 1102 is configured to be moveable along an adjustment path relative to the seat back. For example, head support 1102 may be adjusted along the adjustment path to an upward position as shown in FIG. 16A, to a center position as shown in FIG. 16C, or to a downward position as shown in FIG. 16E. Preferably, the adjustment path is in a vertical or near vertical direction, such as by general alignment with a seat back of a seat. Head support 1102 is coupled to guide 1150 and bracket 1160. Guide 1150 may be positioned to extend in a direction along the adjustment path. For example, guide 1150 may have an axis $A_1$ that is parallel or coaxial with the adjustment path. Bracket 1160 is engaged and/or attached to guide 1150 to facilitate movement of head support 1102 along the adjustment path.

In the embodiment illustrated in FIGS. 14A-19, head support 1102 is attached to guide 1150, and guide 1150 is engaged and/or attached to bracket 1160, so that head support 1102 is coupled to bracket 1160 by way of attachment to guide 1150. Pursuant to this embodiment, guide 1150 may be moveable with head support 1102 along the adjustment path (e.g., as shown in FIGS. 16A-16E). Although not shown, head support 1102 and guides 1150 may be positioned at any point along the adjustment path between the upward and downward positions.

In another embodiment, head support 1102 is attached to bracket 1160, and bracket 1160 is engaged and/or attached to guide 1150, so that head support 1102 is coupled to guide 1150 by way of attachment to bracket 1160. In this embodiment, bracket 1160 may be moveable with head support 1102 along the adjustment path, such that bracket 1160 and head support 1102 are positioned at any point along the adjustment path between the upward and downward positions.

Figure 14C:
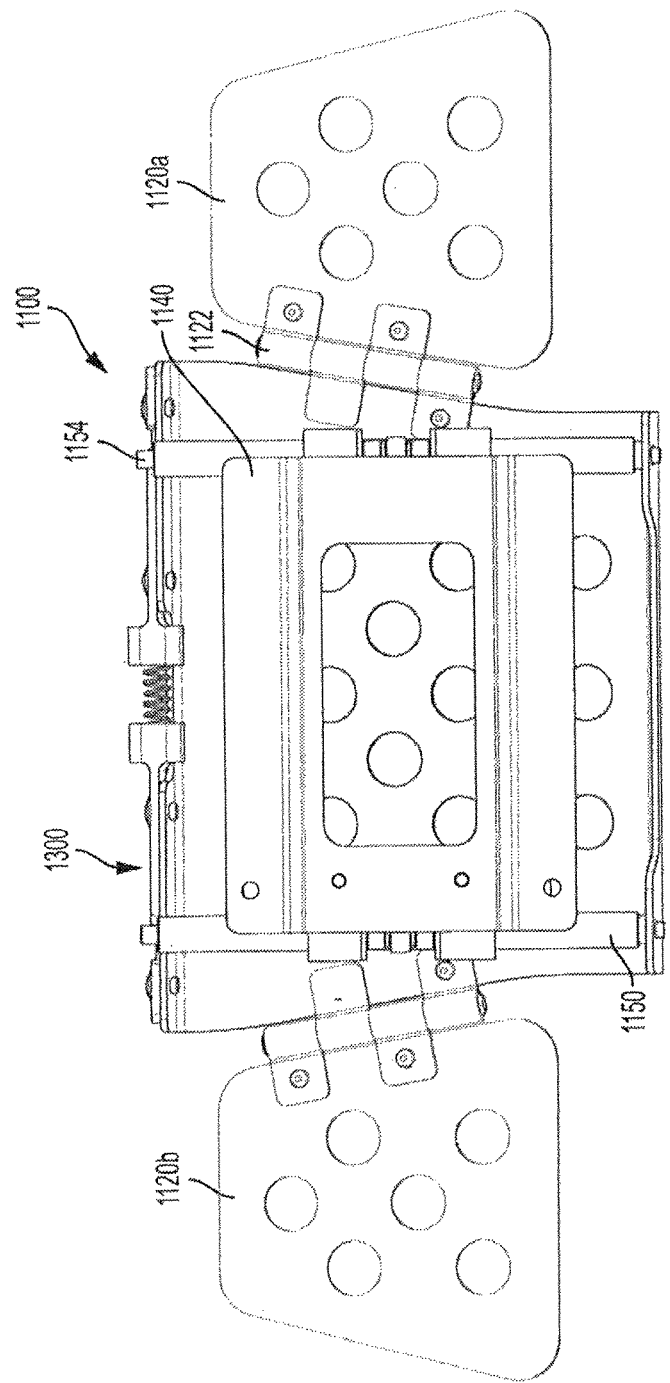
FIG. 14C is a rear view depicting the adjustable headrest of FIG. 14A.
Figure 17A:
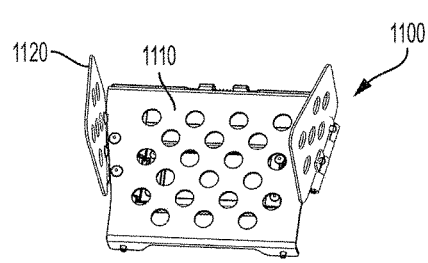
FIGS. 17A-17C are front perspective, rear, and top views of the adjustable headrest of FIG. 14A with the wings angled 90° relative to the center portion of the adjustable headrest.
Figure 17B:
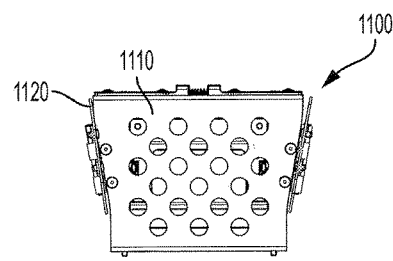
Figure 17C:
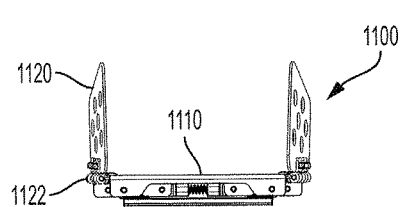
Figure 17D:
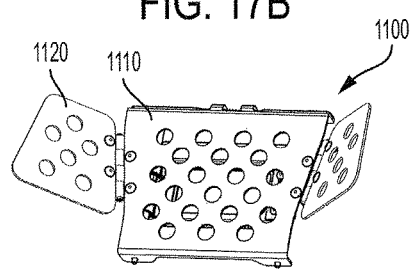
FIGS. 17D-17F are front perspective, rear, and top views of the adjustable headrest of FIG. 14A with the wings angled 45° relative to the center portion of the adjustable headrest.
Figure 17E:
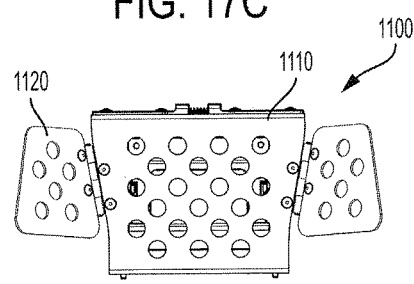
Figure 17F:
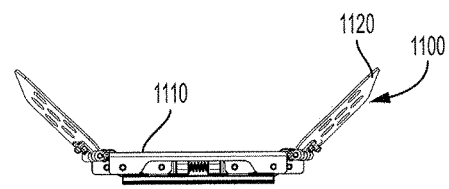
Figure 17G:
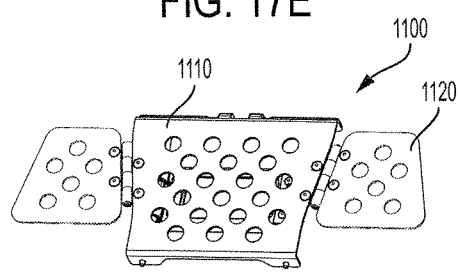
FIGS. 17G-17I are front perspective, rear, and top views of the adjustable headrest of FIG. 14A with the wings aligned with the center portion of the adjustable headrest.
Figure 17H:
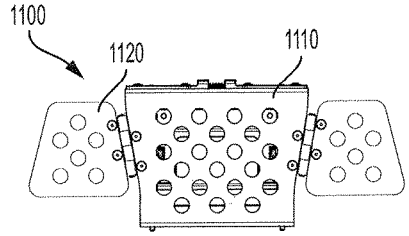
Figure 17I:
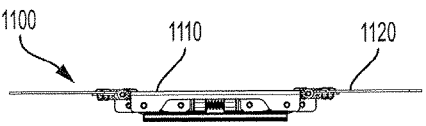

FIG. 14B, adjustable headrest 1100 includes a mounting portion 1140 that is configured for attachment to a seat back. Mounting portion 1140 is further coupled to head support 1102. In one embodiment, mounting portion 1140 is coupled to head support 1102 by way of attachment to guide 1150. In another embodiment, mounting portion 1140 is coupled to head support 1102 by way of attachment to slider 1170. Mounting portion 1140 may be attached to the seat back by mechanical means, such as by welding, riveting, screwing, nailing, bolting, etc., or non-mechanical means, such as by adhesives or the like. As shown in FIG. 14A, for example, rivets may be used for various connections between components of the assembly. For example, rivets are used to fasten hinges of the head support as shown in FIGS. 14A-19.

Implementing mounting portion 1140 enables quick and easy coupling of head support 1102 and/or adjustable headrest 1100 to a seat back. Additionally, mounting portion 1140 may protect the internal components of adjustable headrest 1100, e.g., guide 1150, bracket 1160, slider 1170, retainer 1190, and/or any attachments, from various impacts, forces, pressures, vibrations, or the like, received to mounting portion 1140 as the result of employing adjustable headrest 1100 in a vehicle and/or the result of a passenger's actions, e.g., a child hitting or otherwise impacting the back of the seat and/or adjustable headrest 1100.

Headrest 1100 may include a quick release apparatus for quick and easy coupling of head support 1102 to mounting portion 1140 and/or a seat back. Although quick release apparatus 1300 is coupled to a top portion of head support 1102 in the embodiment illustrated in FIGS. 14A-18H, quick release apparatus 1300 may be coupled to a bottom portion of the head support in another embodiment of the invention. In yet a further embodiment, a first quick release apparatus 1300 is coupled to a top portion of head support 1102 and a second quick release apparatus 1300 is coupled to a bottom portion of head support 1102. Additionally, one or more quick release apparatus such as quick release apparatus 1300 is optionally positioned at one or more intermediate locations between the top portion and bottom portion of the head support 1102.

Figure 18C:
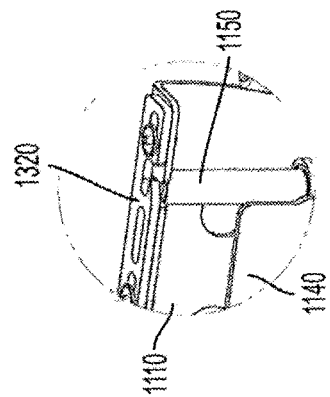
FIG. 18C is an enlarged view of a portion of the quick release apparatus of FIG. 18B in the engaged configuration.
Figure 18B:
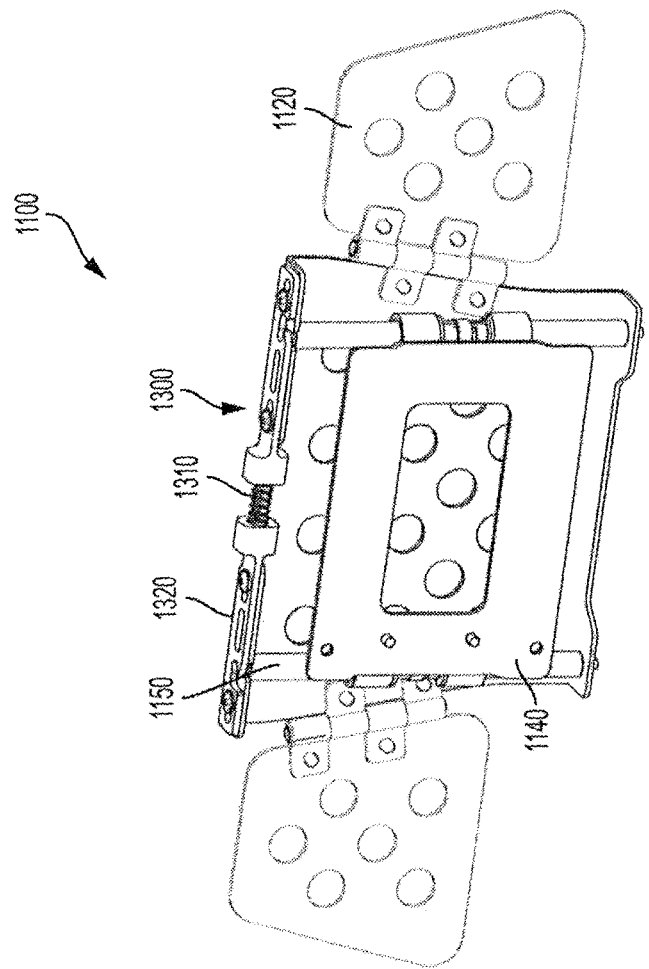
Figure 18D:
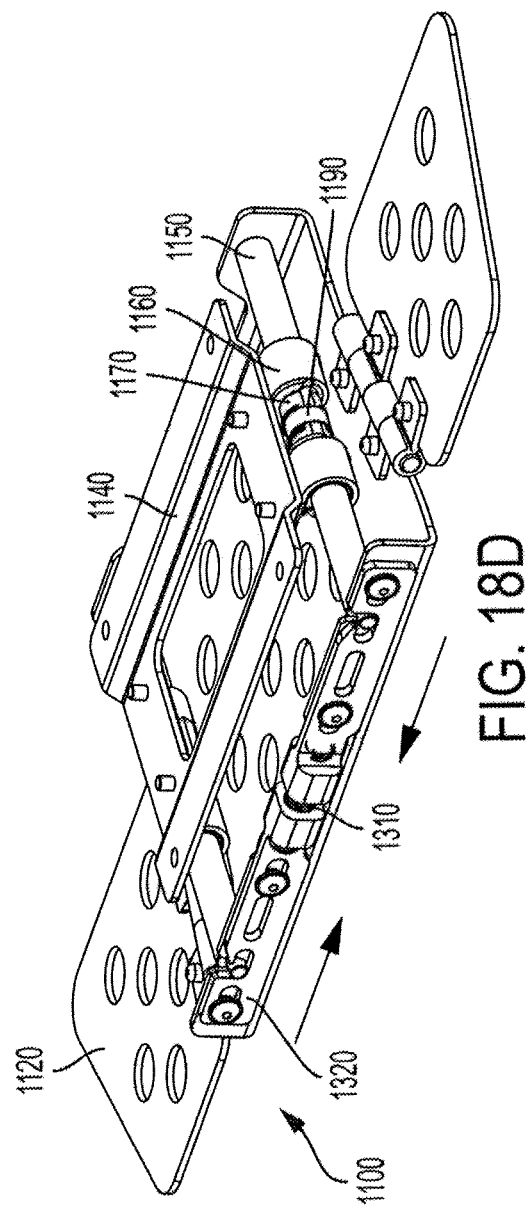
FIGS. 18D and 18E are a rear perspective view of the adjustable headrest apparatus of FIG. 14B and the quick release assembly in the released configuration.
Figure 18F:
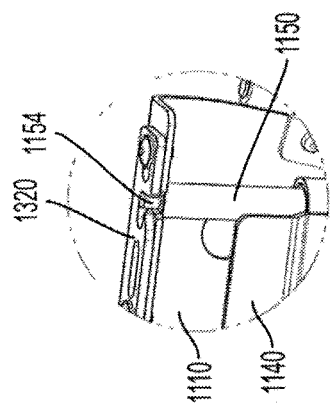
FIG. 18F is an enlarged view of a portion of the quick release apparatus of FIG. 18E in the released configuration.
Figure 18E:
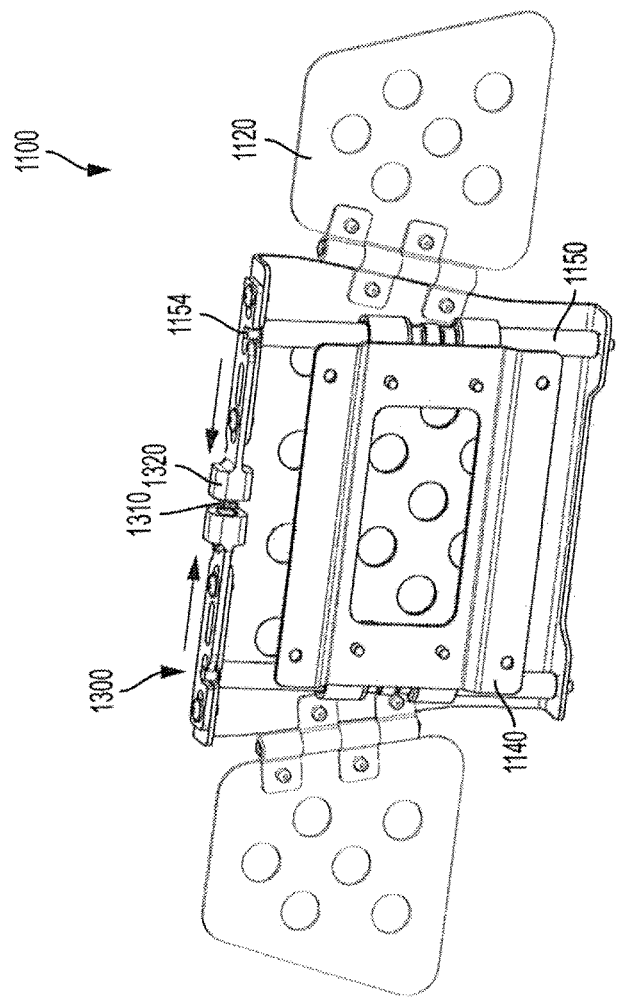
Figure 18H:
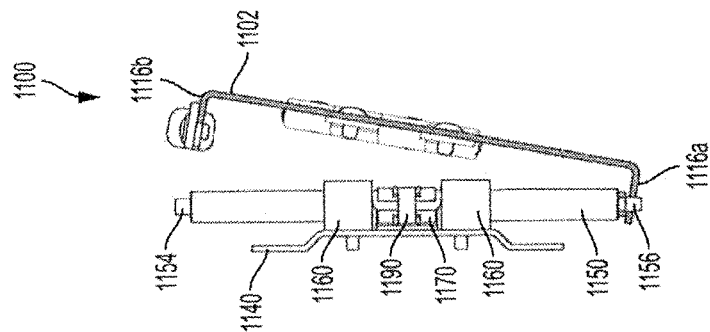
FIG. 18H is a side view of the adjustable headrest apparatus of FIG. 18G.
Figure 18G:
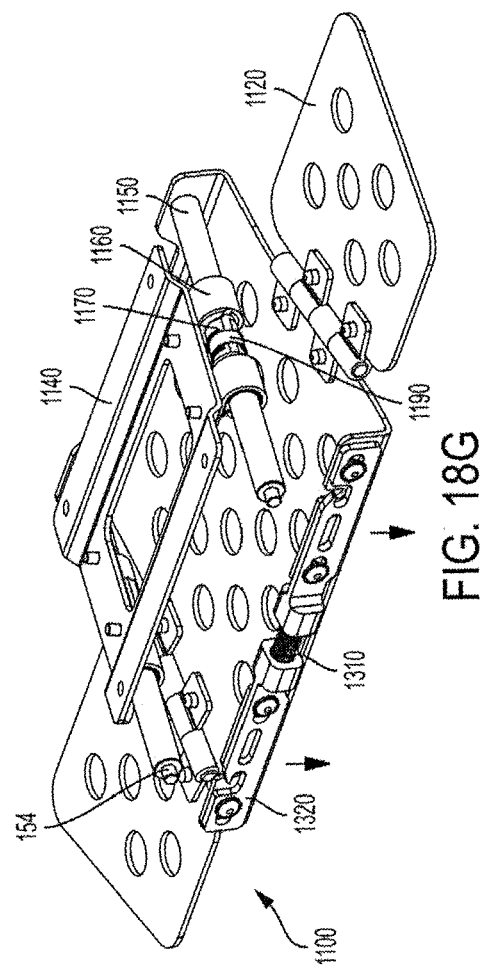
FIG. 18G is a rear perspective view of the adjustable headrest apparatus of FIG. 18B and the quick release assembly with the first end portions of the guides removed from the quick release assembly.
Figure 19:
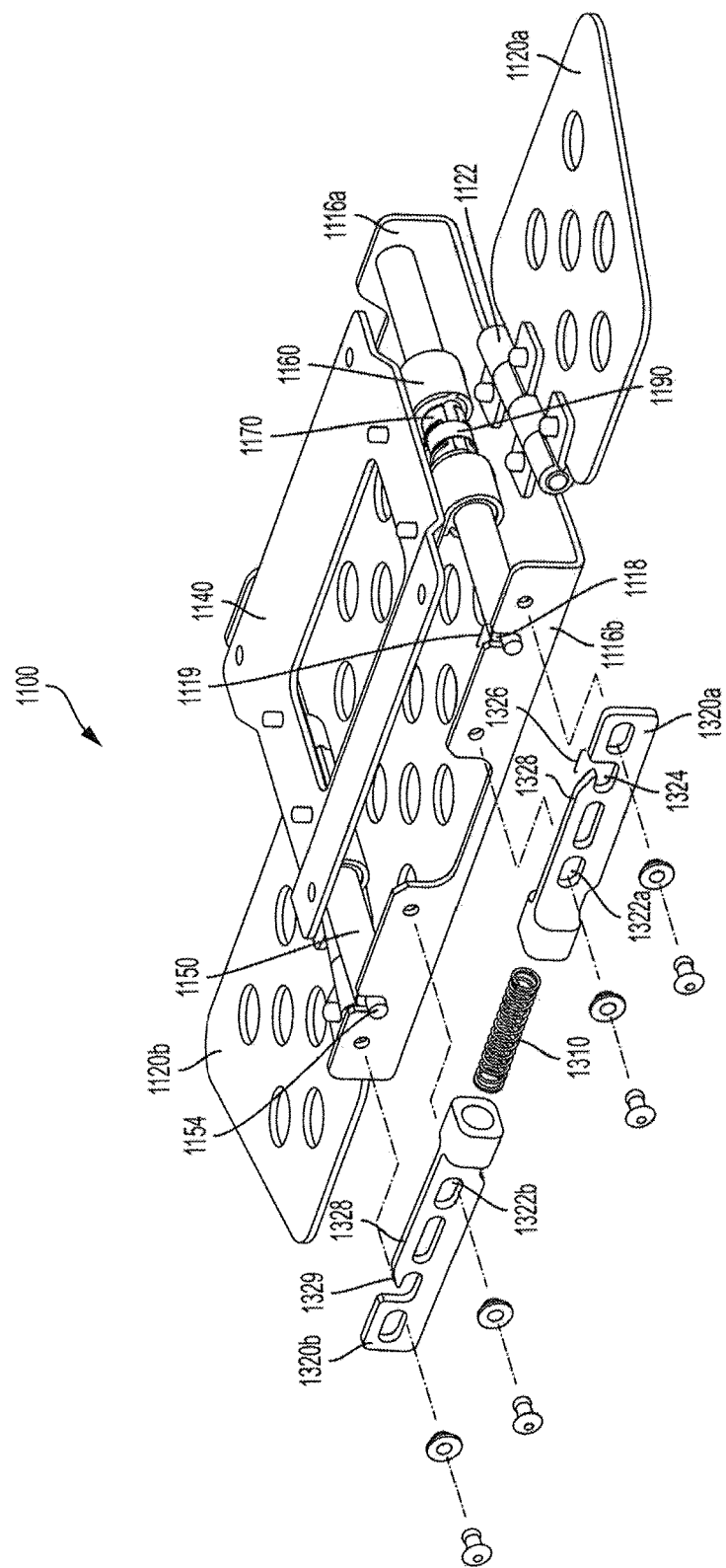
FIG. 19 is an exploded rear perspective view of the quick release assembly of FIGS. 18A-18C.
Figure 21:
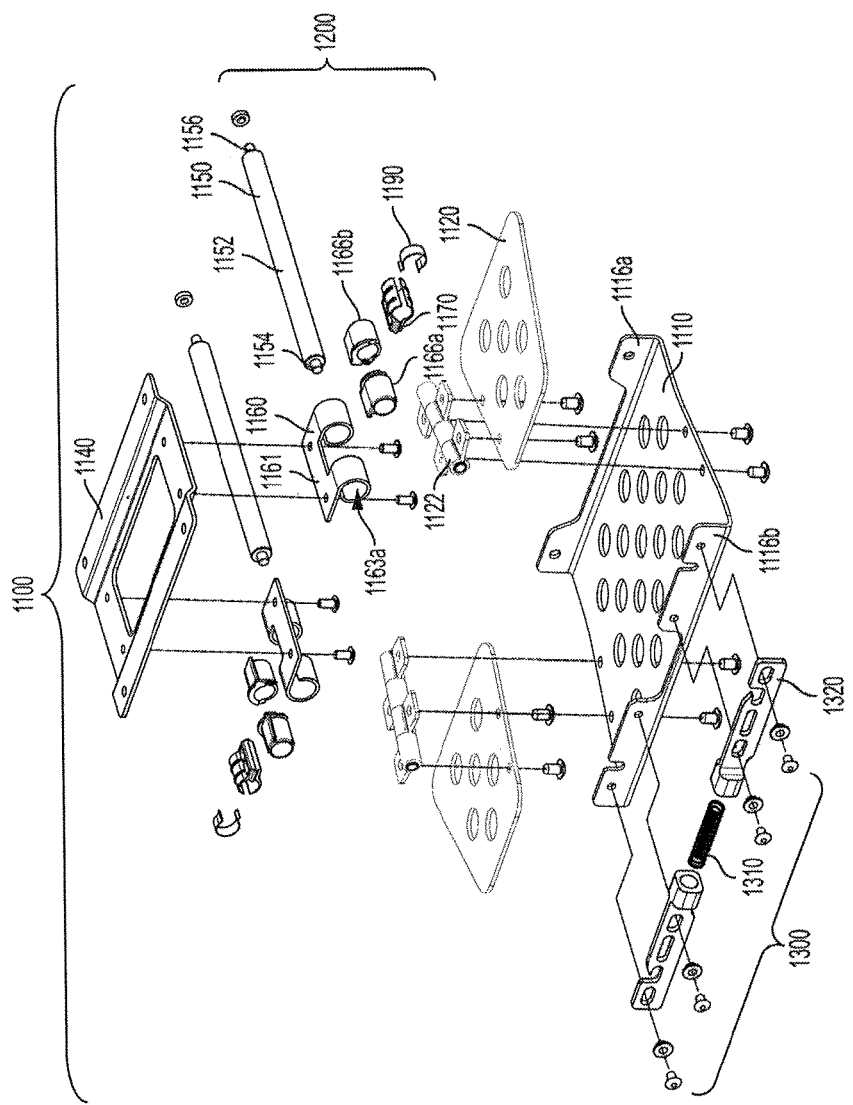
FIG. 21 is an exploded rear perspective view of the adjustable headrest assembly of FIG. 14B.
Figure 22F:
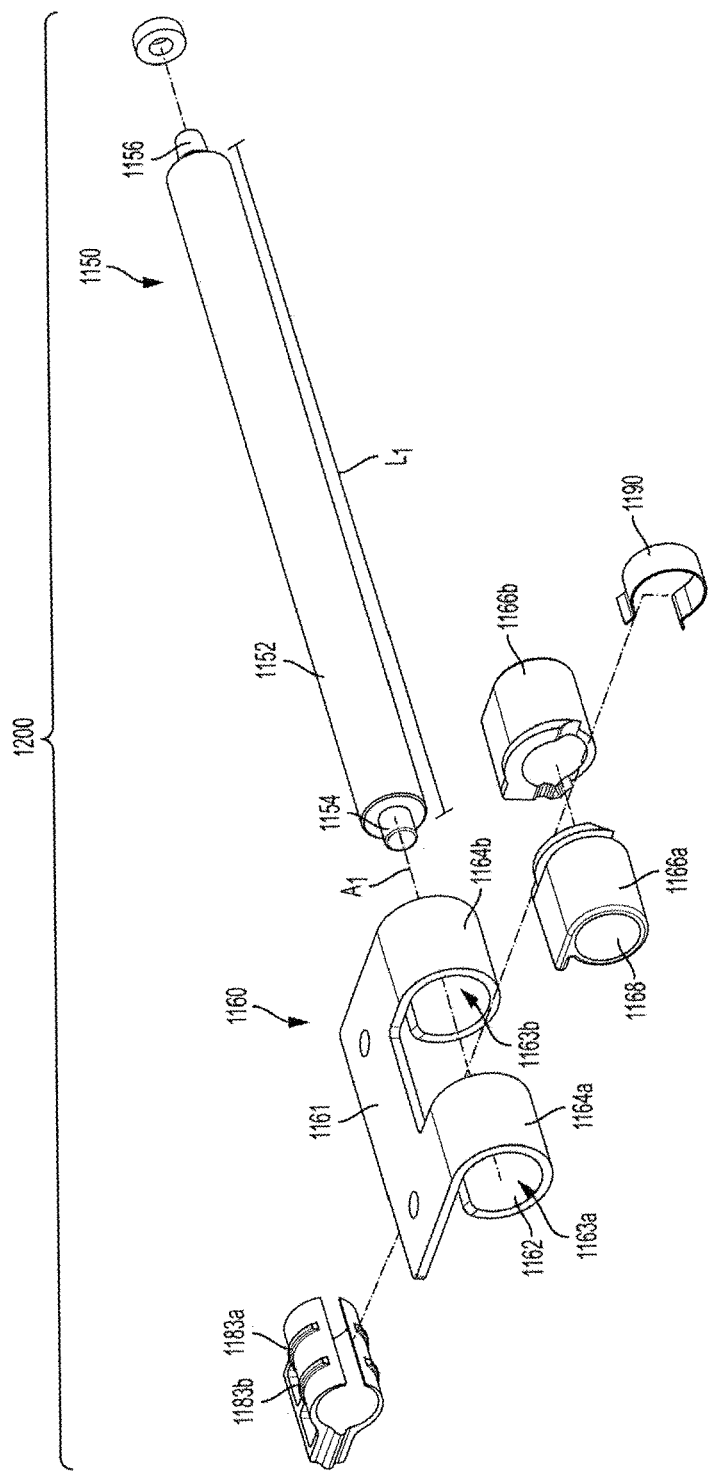
FIG. 22F is an exploded view of the friction module of FIGS. 22A-22E.
Figure 24J:
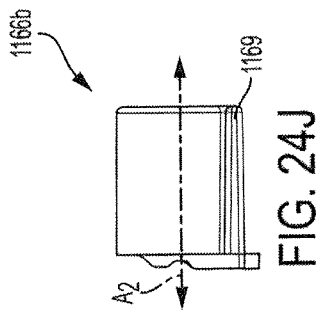
FIGS. 24H-24N are front perspective, rear perspective, front, rear, and side views of the second bushing of FIGS. 22A-22F.
Figure 24M:
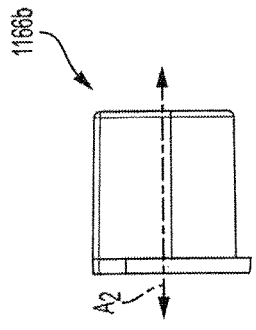
Figure 24I:
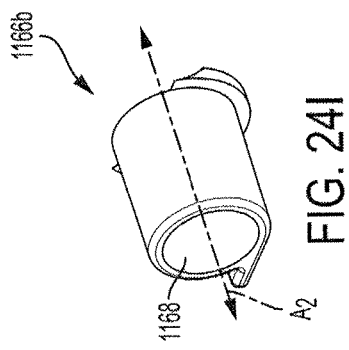
Figure 24L:
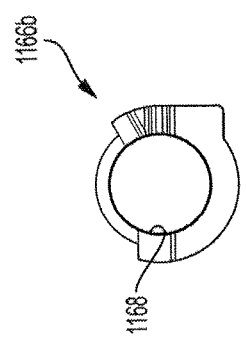
Figure 24N:
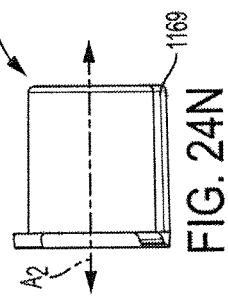
Figure 24H:
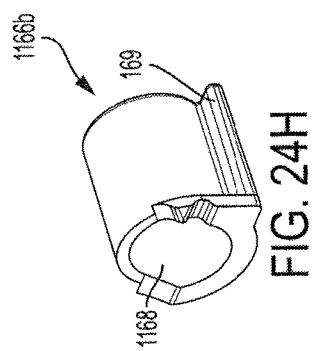
Figure 24K:
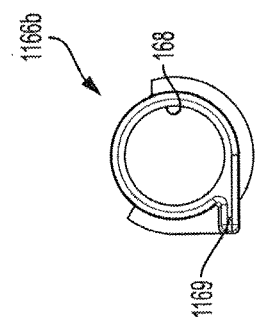
Figure 25A:
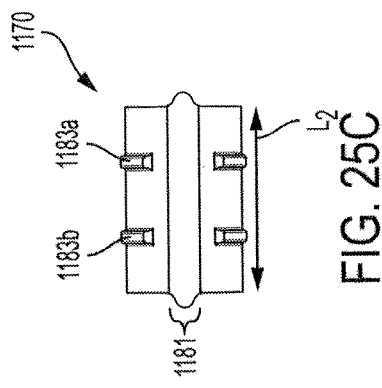
FIGS. 25A-25F are perspective, side, top, and bottom views of the slider of FIGS. 22A-22F.
Figure 25B:
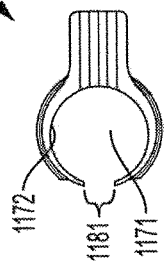
Figure 25C:
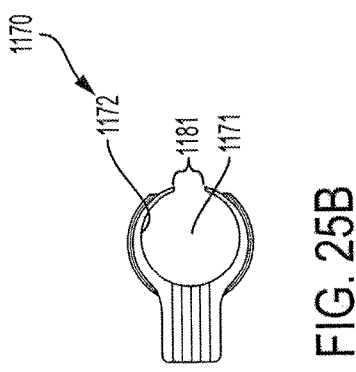
Figure 25D:
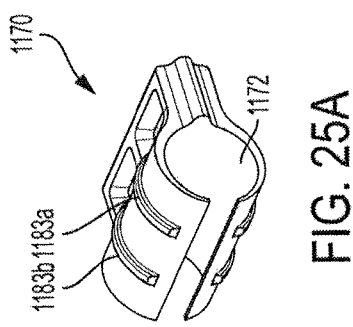
Figure 25E:
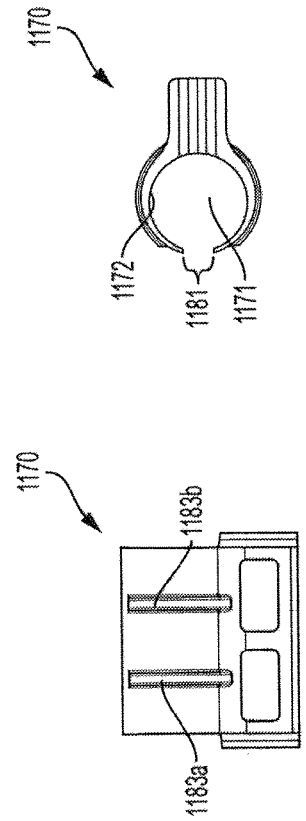
Figure 25F:
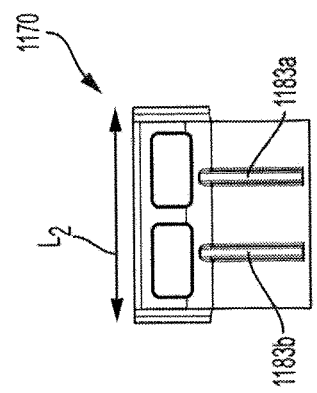

Quick release apparatus 1300 is configured to have an engaged configuration and a released configuration. Quick release apparatus 1300 limits movement of an end portion of guide 1150 in the engaged configuration and permits movement of the end portion of guide 1150 in the released configuration. For example, FIGS. 18A-18C illustrate an embodiment of quick release assembly 1300 in the engaged configuration, while FIGS. 18D-18E illustrate an embodiment of quick release apparatus 1300 in the released configuration.

Referring to the embodiment shown in FIGS. 18A-18E, quick release apparatus 1300 includes a first bracket member 1320a coupled to a second bracket member 1320b by a biasing member 1310. Biasing member 1310 may be a compression spring, an extension spring, a compressible elastomer, or the like Bracket member 1320 delineates a guide receiving slot 1324 having an entrance 1326 at an edge 1328 of quick releasable assembly 1300 for receiving a first end portion 1154 of guide 1150. Preferably, edge 1328 forms a contacting side 1329 on at least one side of entrance 1326. Contact side 1329 is angled with respect to edge 1328, such that imparting a force to contacting side 1329 from a contact with a first end portion 1154 of guide 1150 moves bracket member 1320 to align entrance 1326 with first end portion 1154 of guide 1150. Guide receiving slot 1324 of bracket member 1320 extends from entrance 1326 inwardly in at least a fist direction $D_1$ to receive and/or secure first end portion 1154 of guide 1150. In the embodiment illustrated in FIG. 20B, bracket member 1320 delineates a guide receiving slot 1324 that extends from edge 1328 in a first direction $D_1$ to a receiving position 1330 and extends from receiving portion 1330 in a second direction $D_2$ to a securing position 1332. In another embodiment, bracket member delineates a guide receiving slot 1324 that extends from edge 1328 in a single, first direction $D_1$ to securing position 1332.

Bracket members 320 include at least one coupling slot 1322 for coupling bracket members 1320 to attachment section 1116 of central portion 1110. Coupling slot is adapted for coupling brackets 1320a and/or 1320b to attachment section 1116 of central portion 1110, while permitting brackets 1230a and/or 1230b to slide or be moved relative to each other. Coupling slot 1322 extends in at least a direction permitting bracket member 1320a and/or 1320b to be positioned such that entrance 1326 of bracket member 1320 aligns with entrance 1119 of guide receiving slot 1118 of attachment section 1116 and to be positioned such that entrance 1326 of bracket member 1320 does not align with an entrance 1119 of guide receiving slot 1118.

As discussed above, quick releasable assembly 1300 has an engaged configuration that limits movement of the at least one end portion of the guide relative to quick release assembly 1300 and a released configuration that permits movement of the at least end portion of the guide relative to quick release assembly 1300. In the released configuration, entrance 1326 of bracket member 1320 aligns with entrance 1119 of central portion 1110, which permits first end portion 1154 of guide 1150 to be removed from guide receiving slot 1324. In the engaged configuration, entrance 1326 of bracket member 1320 does not aligns with entrance 1119 of central portion 1110, such that first end portion 1154 of guide 1150 is secured and, e.g., restrained in securing position 1322. In one embodiment, guide receiving slot 1324 of bracket member 1320 is angled with respect to guide receiving slot 1118 of central portion 1110 when entrance 1326 of guide receiving slot 1314 aligns with entrance 1119 of guide receiving slot 1118. In such an embodiment, positioning quick release apparatus 1300 to the released configuration urges the first end portion 1154 of guide 1150 to be removed from guide receiving slot 1324. In the embodiment illustrated in FIG. 18B, when entrance 1326 of guide receiving slot 1314 aligns with entrance 1119 of guide receiving slot 1118, a section of guide receiving slot 1324 (e.g., from securing position 1330 to entrance 1326) of bracket member 1320 is aligned with respect to guide receiving slot 1118 of central portion 1110. Head support 1102 may be configured to rotate about a pivot axis that is defined by a pivot device (not shown). The pivot axis may be angled with respect to the adjustment path, thereby permitting pivotal movement of the head support 1102 with respect to the seat about the pivot axis. In one embodiment, the pivot axis is perpendicular to the adjustment path. In another embodiment, the pivot axis is parallel to the top of the seat back. The pivot device may be employed to enable head support 1102 to rotate toward and/or away from the passenger's head. The pivot device may be designed as a hinge or any other device and/or mechanism that enables pivoting or rotation about an axis. The pivot device may be attached and/or coupled to the head support 1302 component of adjustable headrest 1100 that is also moveable along the adjustment path Referring to FIGS. 22A-22F, exemplary internal components of an adjustable headrest 1100 are further disclosed hereafter. The internal components of adjustable headrest 1100 may include a friction module 1200, which further includes guide 1150, bracket 1160, and slider 1170. Friction module 1200 may also include one or more retainers such as a retainer 1190. Although friction module 1200 is described with reference to an embodiment configured for adjustable headrest 1100, one of skill in the art would readily recognize the various applications of friction module 1200 in other apparatuses, devices, and/or systems based on the description herein. For example, friction module 1200 would be highly advantageous in any device where a predetermined and modifiable amount of friction is desired between two or more components that slide and/or rotate with respect to one another. For example, a friction module (such as friction module 1200 for example or modifications of friction module 1200) would be highly advantageous when used with sliding components of various types of assemblies in various industries and applications. Illustrative examples include furnishings, armrests, tray tables, extensions, adjusters, and any other assembly in which two or more components slide and/or rotate with respect to one another along or about a path or axis.

Guide 1150 has an outer surface 1152 and length $L_1$. Guide 1150 includes a first end portion 1154, as discussed above, and a second end portion 1156 having a tapered shape. The tapered shape of second end portion 1156 permits the first end portion 1154 to be removed from guide receiving slot 1354 of quick release member 1300 and guide receiving slot 1118 of attachment section 1116b by allowing the second end portion 1156 to be angle within an aperture of attachment section 1116a. Guide 1150 may be configured to have a variety of cross-sectional shapes such as a cylinder, a triangle, a rectangle, a hexagon, or any other shape. By providing a non-cylindrical guide, relative rotation of the guide within the slider can be limited or prevented.

Bracket 1160 is fixed relative to head support 1102 or fixed relative to the seat back. Bracket 1160 includes a mounting section 1161 positioned for fixation relative to head support 1102 or for fixation to the seat and a guide receiving portion 1164 for receiving guide 1150. Mounting section 1161 may include apertures as illustrated in FIGS. 23A-23E for attachment to mounting portion 1140 or may be configured for attachment to mounting portion 1140 and/or the seat back by way of other known means.

In the embodiment illustrated in FIGS. 23A-23E, bracket 1160 includes a first guide receiving portion 1164a and a second guide receiving portion 1164b that is spaced from the first guide receiving portion 1164a by a distance $D_3$. The distance $D_3$ between the two guide receiving portions 1164 may be adapted for receiving slider 1170 therebetween. In one embodiment, distance $D_3$ between guide receiving portions 1164a and 1164b is the same or about the same as the length $L_2$ of slider 1170. Length $L_2$ of slider 1170 is determined along a portion of the slider 1170 that is interposed the two guide receive portions 1164 of bracket 1160 when slider 1170 and bracket 1160 are coupled to guide 1150. Preferably, distance $D_3$ between the two guide receiving portions 1164 is configured to capture slider 1170 when bracket 1160 and slider 1170 are coupled to guide 1150, such bracket 1160 and slider 1170 slide concurrently along the adjustment path. Guide receiving portions 1164 have an inner surface 1162 that defines a passageway for receiving bushings 1166. For example, first guide receiving portion 1164a may define a first passageway 1163a for receiving a first bushing 1166a, while the second guide receiving portion 1164b may define a second passageway 1163b for receiving a second bushing 1166b. Bracket 1160 may also define a slot 1165 that is adapted to receive and engage at least a portion of bushings 1166 (e.g., a lip 1169 of bushings 1166).

Bushings 1166 are configured to be received within passageway 1163 of bracket 1160 and have an inner surface 1168 that defines a passageway for receiving guide 1150. Inner surface 1168 of bushings 1166 is adapted to contact outer surface 1152 of guide 1150 when bushings 1166 are positioned interposed inner surface 1162 of bracket 1160 and outer surface 1152 of guide 1150. Inner surface 1168 of bushing 1166 may define a passageway that corresponds to the shape of outer surface 1152 of guide 1150. In one embodiment, the passageway defined by inner surface 1168 of bushings 1166 has an axis $A_2$ extending in the same direction or about the same direction as axis $A_1$ of guide 1150. For example, axis $A_2$ of inner bushing 1166 extends in a direction that varies from the direction of axis $A_1$ of guide 1150 by 3° or less, 2° or less, or by 1° or less. In one embodiment, axis $A_2$ of inner bushing 1166 is coaxial with axis $A_1$ of guide 1150.

Bushing 1166 may include a lip 1169 for engaging and/or rotationally securing bushing 1166 with respect to bracket 1160. For example, lip 1169 of bracket 1160 may be adapted to be received by slot 1165 formed by bracket 1160, such that bushing 1166 is rotationally secured with respect to bracket 1160. Bushings 1166 may be formed of any suitable material, including materials different or the same as bracket 1160, slider 1170, and/or guide 1150. In one embodiment, bushings 1166 are formed of a polymer material that is lightweight and/or produces low/minimal static and kinetic friction during contact with guide 1150. Suitable materials for bushing 1166 include, but are not limited to, Acetal, ABS, and injection moldable grade of plastic. By employing bushings 1166 that are distinct from bracket 1160, bushings 1166 and bracket 1160 may be formed of different materials to produce a friction module 1200 and/or headrest apparatus 1100 having improved strength, while maintaining a desired weight. In addition, by employing bushings 1166 that are distinct from bracket 1160, the failure mode of headrest 1100 during impact testing may be shifted from the slider and/or bracket to the rivets. For example, during testing of two headrests by mounting a load to the head support while affixing the mounting portion of the headrest, it was determined that a headrest having a bracket formed of spring steel and bushings formed of nylon had a failure tensile strength of 210 pounds, while a similar headrest having a bracket and integral bushings formed of PEI (Polyetherimide) had a failure tensile strength of 95 pounds. Additionally, the failure of the headrest having a bracket and integral bushings formed of PEI occurred at the bracket/slider, while the headrest having a bracket formed of spring steel and bushings formed of nylon failed at the top rivet of the bracket.

In other words, it is believed that the reconfiguration of the bracket and slider assembly in this embodiment unexpectedly improves the performance of the headrest under testing simulating a crash or impact. Specifically, by reconfiguring the head rest 1100 to include a bracket with bushings, perhaps independently of the materials selected, the force required for the head rest to fail increases substantially. More specifically, this reconfiguration appears to change the failure mode from a failure of the material at one force to a failure of the rivet fastener at a substantially higher force. As indicated above, the force required for failure more than doubled, and this increase in failure force is believed to be attributable to the reconfiguration of the assembly, not just to the selection of materials.

In addition, the embodiment having a spring steel bracket exhibited increased resilience for retaining metal rivets during peel tests. In these tests, a rear portion of a headrest is mounted to a rigid surface (simulating a seat frame), a front portion of the headrest is raised to the maximum travel height (simulating a worst case scenario), and a load is applied in a forward direction at the center of the top edge of the front section.

Additionally, this embodiment is advantageous in that the headrest remains coupled to the rest of the assembly and to the seat even if there is a failure. This means that the headrest is less likely to become separated from the seat in a crash or impact scenario.

Referring to 25A-52F, slider 1170 has an inner surface 1172 that defines a recess 1171 for receiving guide 1150. Inner surface 1172 of slider 1170 may be in contact with outer surface 1152 of guide 1150 upon recess 1171 receiving guide 1150. Slider 1170 may be configured to have two or more separate inner surfaces 1172 defining one or more recesses 1171 that contact guide 1150. In one embodiment, the two or more separate inner surfaces 1172 of slider 1170 define a single recess 1171. In another embodiment, the two or more separate inner surfaces 1172 of slider 1170 define two or more recess 1171. Additionally and/or alternatively, more than one slider 1170 may be coupled to guide 1150 and/or positioned between guide receiving portions 1164 of bracket 1160.

Slider 1170 and/or guide 1150 may rotate and/or slide with respect to each other. In one embodiment, slider 1170 is prevented from rotation relative to guide 1150 about the axis $A_1$ of guide 1150. For example, slider 1170 may be coupled to mounting portion 1140 to prevent slider 1170 from rotating with respect to guide 1150. By way of further example, the inner surface 1172 of slider 1170 may be configured to have a portion of inner surface 1172, e.g., a protrusion, that engages a portion of outer surface 1152 of guide 1150, e.g., an indent or groove, to prevent rotation of slider 1170 with respect to guide 1150. In another embodiment, slider 1170 is prevented from sliding along length $L_1$ of guide 1150.

The slider 1170 may delineate a gap 1181 extending from recess 1171 to an outer surface 1180 of slider 1170, thereby permitting compression of slider 1170 to increase the friction between inner surface 1172 of slider 1170 and outer surface 1152 of the guide 1150. Gap 1181 enables slider 1170 to be deformed without employing substantial force and/or forming slider 1170 from highly deformable material(s). Accordingly, slider 1170 may be formed from a durable material, such as a plastic material and/or metallic material. In one embodiment, slider 1170 is formed from a plastic material, such as PEI (Polyetherimide). In one embodiment, the majority of the friction produced by slider 1170 and bushings 1166 is produced by the contact of inner surface 1172 of slider 1170 to outer surface 1150 of guide 1150.

Figure 26A:
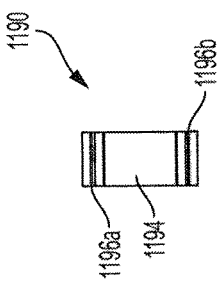
FIGS. 26A-26F are perspective, side, top, and bottom views of the retainer of FIGS. 22A-22F.
Figure 26B:
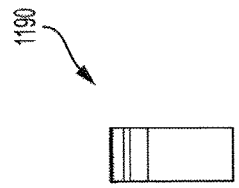
Figure 26C:
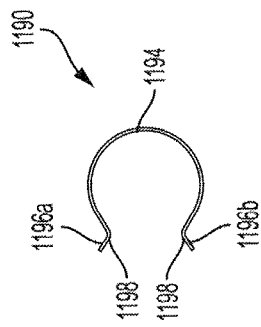
Figure 26D:
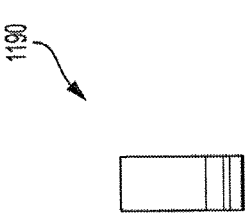
Figure 26E:
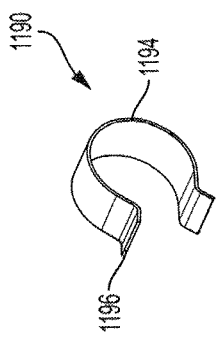
Figure 26F:
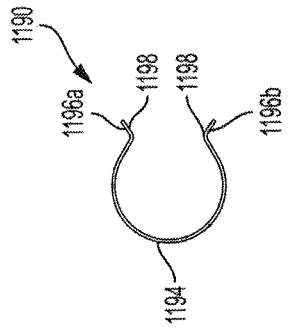

The slider 1170 may be configured to produce varying amounts of friction, e.g., by employing one or more retainers 1190 of different shapes and/or materials. Slider 1170 has an outer surface 1180 that may define plurality of protrusions 1183. Protrusions 1483 may be configured to at least partially receive at least one retainer 1190, e.g., between protrusions 1183a and protrusion 1183b. In one embodiment, retainer 1190 contacts both protrusion 1183a and protrusion 1183b upon being positioned on slider 1170 between protrusion 1183a and 1183b. Referring to FIGS. 26A-16E, retainer 1190 may be positioned to contact at least a portion of the periphery, e.g., the outer surface 1180 of slider 1170. Retainer 1190 may have a shape configured to extend along outer surface 1180 of slider 1170. Retainer 1190 may include end portions 1196 and a middle portion 1194 having one or more curvatures, e.g., as illustrated in FIGS. 26A-26F. The one or more curvatures of middle portion 1194 may extend from a first end portion 1196a to a second end portion 1196b. Although retainer 1190 is illustrated as a band in FIGS. 26A-26E, in an alternative embodiment, retainer 1190 is a clamp or retainer wire.

In one embodiment, middle portion 1194 has a curvature that is C-shaped, i.e., retainer 1190 has the general shape of the letter "c," which is not to be limited to any specific font, size, and/or capitalization. The end portions 1196 may extend in the projected direction of middle portion 1194 as to form an extension of middle portion 1194. Alternatively, end portions 1196 may extend in a direction away from the projected direction of middle portion 1194. For example, end portions 1196 may extend outwardly, away from the center of the curvature of middle portion 1194.

In one embodiment, the curvature of middle portion 1194 and end portions 1196 together form an omega-shape, i.e., retainer 1190 has the general shape of the Greek letter "Ω," which is not to be limited to any specific font, size, and/or capitalization. In another embodiment, a notch portion 1198 is formed at the point of connection between middle portion 1194 and end portions 1196 by end portions 1196 extending in a direction that forms an angle with the projected direction of middle portion 1194. End portions 1196 may also extend inward with respect to the one or more curvatures of middle section 1194. Preferably, retainer 1190 has a shape configured to extend along outer surface 1180 of slider 1170. For example, retainer 1190 may be configured to be received by protrusions 1183 of outer surface 1180 of slider 1170.

Retainer 1190 is provided with a "C" or omega shape, slider 1170 is also preferably provided with a corresponding "C" or omega shape. In other words, the outer surface 1180 between protrusions 1183 may be provided with a shape corresponding generally to that of retainer 1190 in order to provide substantially uniform contact and to evenly distribute the forces generated by retainer 1190 applied to slider 1170. Alternatively, separate contact surfaces can be provided for one or more point or area contacts between slider 1170 and retainer 1190.

Retainer 1190 may be employed to urge inner surface 1172 of slider 1170 against outer surface 1152 of guide 1150, thereby maintaining friction between inner surface 1172 of slider 1170 and outer surface 1152 of guide 1150. By employing retainer 1190, unintended movement between slider 1170 and guide 1150 along the adjustment path may be resisted and/or prevented. For example, resisting and/or preventing unintended movement between slider 1170 and guide 1150 includes providing sufficient friction to maintain the position of adjustable headrest 1100 under forces such as: the forces produced by gravity, e.g., on head support 1102 and other components of adjustable headrest 1100 that are not fixed along the adjustment path with respect to the seat; forces produced by the vehicle's movement, e.g., vibrations, acceleration, deceleration, bumps or jolts, and/or take-off and landings; and forces produced by the passenger that were not intended to adjust the adjustable headrest 1100, e.g., movement of the passenger's head while his or her head is contacting head support 1102 and/or lightly bumping into adjustable headrest 1100. Retainer 1190 may be formed of various materials including plastics and or metallic compounds. In one embodiment, retainer 1190 is formed from a metallic material.

Slider 1170 may be configured to support one or more retainers 1190, whereby the friction between inner surface 1172 of slider 1170 and outer surface 1152 of guide 1150 is increased by adding one or more additional retainers 1190. In one embodiment, outer surface 1180 of slider 1170 defines plural protrusions 1183 positioned to at least partially receive retainers 1190.

Slider 1170, and/or retainer 1190, a friction module 1200 and/or adjustable headrest 1100 may be configured to have an amount of friction between inner surface 1172 of slider 1170 and outer surface 1152 of guide 1150 as slider 1170 is moved relative to guide 1150 along the adjustment path that is within a predetermined range, thus providing a range of force needed to move guide 1150 and slider 1170 with respect to one another. Additionally, the predetermined range of force may be maintained after a predetermined number of cycles of movement of slider 1170 relative to guide 1150 along the adjustment path. In one embodiment, the materials used in guide 1150, slider 1170, and/or retainer 1190 are selected so that the predetermined range of friction is maintained over a predetermined range of temperatures.

For example, a friction module such as friction module 1200 and/or an adjustable headrest such as adjustable headrest 1100 may be configured to have a force range of 3-6 lb. such that a force in that range is required to slide the components with respect to one another along the adjustment path. A sliding force within the force range can be provided by a single guide 1150 and a single slider 1170 on that guide 1150, by a single guide 1150 and plural slider 1170, or by plural guides 1150 and plural sliders 1170 on the guides 1150. Each such guide 1150 and slider 1170 would therefore be configured to provide a predetermined sliding force, either alone or in combination with one or more other guides 1150 and sliders 1170.

Such a predetermined range of forces is preferably maintained over a substantial product life, during which the relative position of the components are cycled in each movement. For example, even after a predetermined number of cycles of movement of guide 1150 relative to slider 1170 along the adjustment path, the force required to move guide 1150 relative to slider 1170 preferably remains within a predetermined range of forces. While various numbers of cycles can be selected, a number of cycles is optionally selected within a range of 10,000-20,000.

Such a predetermined range of forces is also preferably maintained over a substantial temperature range, recognizing that the relative position of the components may be changed in various temperature environments. For example, even over a substantial temperature range, the force required to move guide 1150 relative to slider 1170 preferably remains within a predetermined range of forces. While various temperature ranges can be selected, one exemplary temperature range is −20° C. to +40° C.

A kit for an adjustable headrest may include one or more of the aforementioned components of the adjustable headrest 1100 including a friction module 1200 and/or a rotational hinge as described herein. The kit for an adjustable headrest may further include a pivot device and one or more cushions (not shown) and/or covering materials (not shown). The one or more cushions and/or covering materials may be coupled to the head support portion 1102. Suitable techniques for employing one or more cushions or covering materials to the adjustable headrest 1100 for providing additional comfort to a user will be understood by one of skill in the art from the description herein.

Additionally, one of skill in the art would understand how to assemble the adjustable headrest kit based on the drawings and description provided herein. Embodiments of kits for adjustable headrest 1100 enable an assembler to increase or decrease the force required by a user to adjust the head support 1102 along the adjustment path by increasing or decreasing the friction produced between inner surface 1172 of slider 1170 and outer surface 1152 of guide 1150.

One exemplary method for increasing or decreasing the friction produced between inner surface 1172 of slider 1170 and outer surface 1152 of guide 1150 includes adding or removing retainers 1190 to slider 1170. Another exemplary method includes replacing one or more retainers 1190 with one or more retainers 1190 formed of a different material or having a different shape. Yet, another exemplary method includes replacing guide 1150 and/or slider 1170 with a guide 1150 and/or slider 1170 of a different material and/or shape.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An adjustable headrest comprising:
   a guide;
   a head support coupled to the guide and configured to be movable along an adjustment path relative to the seat;
   a slider having a surface defining a recess receiving the guide such that the surface of the slider contacts a surface of the guide;
   a retainer positioned to urge the surface of the slider against the surface of the guide, thereby maintaining friction between the surface of the slider and the surface of the guide and resisting unintended movement of the slider with respect to the guide along the adjustment path; and
   a bracket fixable relative to the head support or fixed relative to the seat, the bracket having a mounting section positioned for fixation relative to the head support or for fixation to the seat and a guide receiving portion receiving the guide;
   the slider and the bracket being separate components and being formed from the same material or different materials; and
   the slider and the bracket being positioned such that the guide receiving portion of the bracket does not overlap with the slider in a direction along the adjustment path when the guide is received in the recess of the slider and in the guide receiving portion of the bracket.

2. The adjustable headrest of claim 1, wherein the guide is attached to the head support and is moveable with the head support along the adjustment path.

3. The adjustable headrest of claim 1, wherein the slider is moveable relative to the head support.

4. The adjustable headrest of claim 1, further comprising a mounting portion that is configured for attachment to a seat.

5. The adjustable headrest of claim 4, wherein movement of the slider relative to the mounting portion is restricted.

6. The adjustable headrest of claim 4, wherein the guide receiving portion of the bracket defines at least one recess receiving the guide.

7. The adjustable headrest of claim 1, the head support including a central portion and at least one wing coupled for pivotal motion relative to the central portion.

8. The adjustable headrest of claim 7, wherein the at least one wing is coupled for motion about a pivot axis angled with respect to the adjustment path.

9. The adjustable headrest of claim 1, further comprising a pivot device coupled to the head support and defining a pivot axis angled with respect to the adjustment path, thereby permitting pivotal movement of the head support with respect to the seat about the pivot axis.

10. The adjustable headrest of claim 9, wherein the pivot axis of the pivot device is perpendicular to the adjustment path.

11. The adjustable headrest of claim 1, wherein the guide receiving portion of the bracket defines two or more recesses.

12. The adjustable headrest of claim 1, wherein the slider defines a gap extending from the recess to an outer surface of the slider, thereby permitting compression of the slider to increase the friction between the surface of the slider and the surface of the guide.

13. The adjustable headrest of claim 12, wherein the outer surface of the slider defines at least one ridge positioned to limit movement of the retainer relative to the outer surface of the slider.

14. The adjustable headrest of claim 1, wherein the slider is formed from a plastic material.

15. The adjustable headrest of claim 1, wherein the retainer has a shape configured to extend along an outer surface of the slider.

16. The adjustable headrest of claim 1, wherein the retainer includes end portions and a curvature extending between the end portions.

17. The adjustable headrest of claim 16, wherein the curvature is C-shaped.

18. The adjustable headrest of claim 17, wherein the curvature and the end portions of the retainer together form an omega shape.

19. The adjustable headrest of claim 1, wherein the retainer is formed from a metallic material.

20. The adjustable headrest of claim 1, comprising plural guides and plural brackets fixable relative to the seat or fixed relative to the head support, each bracket having a guide receiving portion receiving one of the guides.

21. The adjustable headrest of claim 20, the slider and the bracket being formed from different materials.

22. The adjustable headrest of claim 1, further comprising a bushing received in the guide receiving portion of the bracket, the bushing receiving the guide.

23. The adjustable headrest of claim 1, the guide receiving portion of the bracket defining two or more recesses spaced from one another, the slider being positioned within the space between the recesses defined by the guide receiving portion of the bracket, the adjustable headrest further comprising plural bushings, one of the bushings being received in each of the recesses and receiving the guide.

24. An adjustable headrest comprising:
a guide;
a head support coupled to the guide and configured to be movable along an adjustment path relative to the seat;
a slider having a surface defining a recess receiving the guide such that the surface of the slider contacts a surface of the guide;
a retainer positioned to urge the surface of the slider against the surface of the guide, thereby maintaining friction between the surface of the slider and the surface of the guide and resisting unintended movement of the slider with respect to the guide along the adjustment path; and
a bracket fixable relative to the head support or fixed relative to the seat, the bracket having a mounting section positioned for fixation relative to the head support or for fixation to the seat and a guide receiving portion receiving the guide;
the slider and the bracket being separate components and being formed from the same material or different materials;
wherein the guide receiving portion of the bracket defines two or more recesses; and
wherein the recesses defined by the guide receiving portion of the bracket receive the guide and are spaced from one another, the slider being positioned within the space between the recesses defined by the guide receiving portion of the bracket.

25. An adjustable headrest comprising:
a guide having a first end portion and a second end portion opposed the first end portion;
a head support coupled to the guide and configured to be movable along an adjustment path relative to the seat;
a bracket fixable or fixed relative to the seat, the bracket having a mounting section fixed or fixable to the seat and a guide receiving portion for receiving the guide; and
a releasable assembly having an engaged configuration and a released configuration, the release assembly limiting movement of the at least one end portion of the guide in the engaged configuration and permitting movement of the at least one end portion of the guide in the released configuration,
wherein the head support includes a slot having an entrance at an edge of the head support, the slot of the head support extending from the entrance inwardly in a first direction to a distal end for receiving the first end portion of the guide, and
the releasable assembly includes a bracket member delineating a slot having an entrance at an edge of the releasable assembly, the slot of the bracket member extending from the entrance inwardly in a second direction to a receiving end for receiving the first end portion of the guide, and
wherein the entrance of the slot of the head support aligns with the entrance of the slot of the bracket member when the releasable assembly is in the released configuration, and the entrance of the slot of the head support is offset with the entrance of the slot of the bracket member when the releasable assembly is in the engaged configuration.

26. The adjustable headrest of claim 25, wherein the slot of the releasable assembly extends in the second direction to the received position and extends from the received position in a third direction to a secured position.

27. The adjustable headrest of claim 25, wherein the first direction of the slot of the head support is angled with respect to the second direction of the slot of the bracket member.

28. The adjustable headrest of claim 26, wherein the releasable assembly includes a biasing member configured to biasing the bracket member along the third direction, such that the bracket member is biased to receive the first end portion of the guide in the secured position.

29. The adjustable headrest of claim 25, wherein the end portion of the guide has a tapered configuration.

30. A friction module comprising:
   a guide;
   a slider having a surface defining a recess receiving the guide such that the surface of the slider contacts a surface of the guide;
   a retainer positioned to urge the surface of the slider against the surface of the guide, thereby maintaining friction between the surface of the slider and the surface of the guide and resisting unintended movement of the slider with respect to the guide along an adjustment path; and
   a bracket having a guide receiving portion receiving the guide;
   the slider and the bracket being separate components and being formed from the same material or different materials; and
   the slider and the bracket being positioned such that the guide receiving portion of the bracket does not overlap with the slider in a direction along the adjustment path when the guide is received in the recess of the slider and in the guide receiving portion of the bracket.

31. The friction module of claim 30, wherein the slider is configured to support plural retainers and the friction between the surface of the slider and the surface of the guide is increased by adding one or more additional retainers.

32. The friction module of claim 30 comprising plural retainers, wherein an outer surface of the slider defines plural grooves positioned to at least partially receive the retainers.

* * * * *